(12) United States Patent
Okamura

(10) Patent No.: US 8,335,846 B2
(45) Date of Patent: Dec. 18, 2012

(54) AUTHENTICATION SYSTEM, MULTIFUNCTIONAL PERIPHERAL AND AUTHENTICATION SERVER

(75) Inventor: Akihiro Okamura, Osaka (JP)

(73) Assignee: Sharp Kabushiki Kaisha, Osaka-Shi, Osaka (JP)

( * ) Notice: Subject to any disclaimer, the term of this patent is extended or adjusted under 35 U.S.C. 154(b) by 261 days.

(21) Appl. No.: 12/806,638

(22) Filed: Aug. 18, 2010

(65) Prior Publication Data

US 2011/0055366 A1    Mar. 3, 2011

(30) Foreign Application Priority Data

Aug. 27, 2009    (JP) ................. 2009-196857

(51) Int. Cl.
*G06F 15/173* (2006.01)
(52) U.S. Cl. ....................................... 709/223; 709/225
(58) Field of Classification Search .................. 709/223, 709/225
See application file for complete search history.

(56) References Cited

U.S. PATENT DOCUMENTS

| | | |
|---|---|---|
| 2005/0182792 A1 | 8/2005 | Israel et al. |
| 2006/0155653 A1 | 7/2006 | Persokrud et al. |
| 2006/0248473 A1 | 11/2006 | Nagumo |

FOREIGN PATENT DOCUMENTS

| | | |
|---|---|---|
| CN | 101099149 A | 1/2008 |
| CN | 101262392 A | 9/2008 |
| EP | 1540929 B1 | 1/2009 |
| JP | 2001-306204 A | 11/2001 |
| JP | 2006-243413 A | 9/2006 |
| JP | 2006-308831 A | 11/2006 |
| JP | 2007-130981 A | 5/2007 |
| JP | 2008-273126 A | 11/2008 |

*Primary Examiner* — Adnan Mirza
(74) *Attorney, Agent, or Firm* — Edwards Wildman Palmer LLP; David G. Conlin; David A. Tucker

(57) ABSTRACT

The multi-functional peripheral judges whether or not the last display screen at the time of logout is usable as the initial display screen at the time of next login. Then, when the last display screen at the time of logout is not usable as the initial display screen at the time of next login, not information to specify the last display screen at the time of logout but a predetermined screen information is set to be transmitted to an authentication server. The authentication server manages information to specify the last display screen given from a multi-functional peripheral, and notifies the multi-functional peripheral of the last display screen information of the user to display the screen on the multi-functional peripheral when a user logs in the multi-functional peripheral next time.

22 Claims, 11 Drawing Sheets

AUTHENTICATION SYSTEM, MULTIFUNCTIONAL PERIPHERAL AND AUTHENTICATION SERVER

CROSS-NOTING PARAGRAPH

This non-provisional application claims priority under 35 U.S.C. §119(a) on Patent Application No. 2009-196857 filed in JAPAN on Aug. 27, 2009, the entire contents of which are hereby incorporated herein by reference.

FIELD OF THE INVENTION

The present invention relates to an authentication system, a multi-functional peripheral and an authentication server, and more particularly to a multi-functional peripheral capable of performing user authentication processing in cooperation with an authentication server, an authentication server thereof and an authentication system provided with the multi-functional peripheral, the authentication server and an application server.

BACKGROUND OF THE INVENTION

A system has been devised in which functions of applications which operate on a PC and functions of a multi-functional peripheral are associated with each other, so that the multi-functional peripheral is able to operate as a part of a total application system. By using the system, it is possible to perform uniform management of accounting functions including authentication/totalization by a server. Such a server is referred to as an authentication system in the below.

Conventionally, a default screen (copy screen, etc.) designated by the multi-functional peripheral has been displayed in an initial display screen after a user logged in a multi-functional peripheral. Alternatively, it was possible to display a screen used by a user at the time of logout as an initial display screen after completing authentication by using an authentication function incorporated in a multi-functional peripheral. Additionally, another system has been devised that is able to designate a screen used at the time of logout as an initial display screen after completing authentication by using an authentication server connected to the outside of a multi-functional peripheral.

Japanese Laid-Open Patent Publication No. 2008-273126 discloses, for example, an image forming apparatus whose object is to improve user friendliness by preventing a situation where screen that is unfavorable to a user is firstly displayed. This image forming apparatus stores contents and a selection order according to a plurality of functions in association with each user, when each of a plurality of users sequentially selects a plurality of functions within a predetermined time after user authentication. Subsequently, when customized information of an applicable user is read out from a customized information storage portion, an initial display screen according to a function selected first (first order) among a plurality of functions is read out to be displayed on a touch panel portion. This makes it possible to provide an initial display screen appropriately customized for each user by considering a function selection order for each of a plurality of users, and as a result, it has been possible to improve user friendliness by preventing a situation where screen that is unfavorable to a user is displayed first.

Many functions are installed in a recent multi-functional peripheral, and many setting screens for setting these functions are present. Therefore, it is common to configure a setting screen of each function for a hierarchical structure.

Here, some conventional multi-functional peripherals have a function that displays a screen displayed at the time of logout as an initial display screen when logging in again after a user logs out as mentioned above. In this case, there has been a case where a screen that positions in a deep hierarchy is not necessarily appropriate for displaying as an initial display screen. For example, when a user logs out in a state where a detailed setting screen of a scanner is displayed, in the case where the same user logs in next time, the detailed setting screen of a scanner is displayed, which has been inappropriate as a setting screen to be displayed as an initial display screen at the time of login.

SUMMARY OF THE INVENTION

An object of the present invention is to provide an authentication system provided with a function for displaying a screen at the time of previous logout at the time of logging in the multi-functional peripheral, wherein the authentication system is able to improve user friendliness, and optimize the initial display screen at the time of login by changing an initial display screen corresponding to a last display screen at the time of logout from a multi-functional peripheral, a multi-functional peripheral included in the authentication system and an authentication server.

Another object of the present invention is to provide an authentication system composed of a multi-functional peripheral and an authentication server that is connected to and is able to communicate with the multi-functional peripheral and performs authentication of login information input in the multi-functional peripheral, comprising: an initial display screen storage portion for storing information to specify a screen capable of initially displaying at the time of login of the multi-functional peripheral in advance; and a judging portion for comparing information to specify a last display screen of the multi-functional peripheral with information stored in the initial display screen storage portion and judging whether or not the information to specify the last display screen is appropriate as information to specify an initial display screen at the time of login, wherein when the judging portion judges that the last display screen at the time of logout of the multi-functional peripheral is inappropriate as the initial display screen, another screen in accordance with a predetermined condition is displayed in the multi-functional peripheral.

Another object of the present invention is to provide the authentication system, wherein the authentication server has: a storage portion for storing information to specify the last display screen at the time of logout from the multi-functional peripheral that is given from the multi-functional peripheral; and a notifying portion for notifying the multi-functional peripheral of initial mode setting information to instruct an initial display screen after login of the multi-functional peripheral, wherein the initial mode setting information includes the information to specify the last display screen and information to indicate that the last display screen is displayed as the initial display screen, and the multi-functional peripheral has: a notifying portion for notifying the authentication server of the information to specify the last display screen at the time of logout of the multi-functional peripheral; a control portion for controlling to display the last display screen as an initial display screen after login based on the initial mode setting information received from the authentication server; the initial display screen storage portion; and the judging portion, wherein the judging portion compares the information to specify the last display screen at the time of logout with the information stored in the initial display screen storage portion and judges whether or not the information to specify the last display screen is appropriate as information to specify an initial display screen at the time of next login, and notifies the authentication server of not the information to specify the last display screen at the time of logout but information to specify another screen in accordance with a predetermined condition as the information to specify the last display screen when the judging portion judges that the last display screen at the time of logout is inappropriate as the information to specify the initial display screen.

Another object of the present invention is to provide the authentication system, wherein the another screen in accordance with the predetermined condition is a previously determined screen to be displayed as an initial display screen when the last display screen at the time of logout is judged to be inappropriate as the information to specify the initial display screen.

Another object of the present invention is to provide the authentication system, wherein the multi-functional peripheral enables display change between hierarchies of a screen having a hierarchical structure in accordance with a predetermined operation, and when the information to specify the last display screen at the time of logout is not consistent with the information stored in the initial display screen storage portion and when information to specify a screen of an upper hierarchy of the last display screen has been stored in the initial display screen storage portion, the another screen in accordance with the predetermined condition is a screen of the closest hierarchy to the last display screen among screens of the upper hierarchy of the last display screen.

Another object of the present invention is to provide the authentication system, wherein the authentication server has: a storage portion for storing information to specify a last display screen at the time of logout from the multi-functional peripheral that is given from the multi-functional peripheral; and a notifying portion for notifying the multi-functional peripheral of initial mode setting information to instruct an initial display screen after login of the multi-functional peripheral, wherein the initial mode setting information includes the information to specify the last display screen and information to indicate that the last display screen is displayed as the initial display screen, and the multi-functional peripheral has: a notifying portion for notifying the authentication server of the information to specify the last display screen at the time of logout of the multi-functional peripheral; a control portion for controlling to display the last display screen as an initial display screen after login based on the initial mode setting information received from the authentication server; the initial display screen storage portion; and the judging portion, wherein the judging portion compares the information to specify the last display screen included in the initial mode setting information with the information stored in the initial display screen storage portion and judges whether or not the information to specify the last display screen is appropriate as information to specify an initial display screen at the time of login, and when the judging portion judges that the information to specify the last display screen included in the initial mode setting information is inappropriate as the information to specify the initial display screen, not the last display screen designated by the initial mode setting information but another screen in accordance with a predetermined condition is displayed as the initial display screen at the time of login.

Another object of the present invention is to provide the authentication system, wherein the another screen in accordance with the predetermined condition is a previously determined screen to be displayed as an initial display screen when the information to specify the last display screen included in the initial mode setting information is judged to be inappropriate as the information to specify the initial display screen.

Another object of the present invention is to provide the authentication system, wherein the multi-functional peripheral enables display change between hierarchies of a screen having a hierarchical structure in accordance with a predetermined operation, and when the information to specify the last display screen included in the initial mode setting information is not consistent with the information stored in the initial display screen storage portion and when the information to specify the screen of the upper hierarchy of the last display screen has been stored in the initial display screen storage portion, the another screen in accordance with the predetermined condition is the screen of the closest hierarchy to the last display screen among the screens of the upper hierarchy of the last display screen.

Another object of the present invention is to provide the authentication system, wherein the multi-functional peripheral has: a notifying portion for notifying the authentication server of the information to specify the last display screen at the time of logout of the multi-functional peripheral; and a control portion for controlling to display the last display screen as an initial display screen after login based on the initial mode setting information received from the authentication server, and the authentication server has: a storage portion for storing the information to specify the last display screen at the time of logout from the multi-functional peripheral that is given from the multi-functional peripheral; a notifying portion for notifying the multi-functional peripheral of initial mode setting information including the information to specify the last display screen and information to indicate that the last display screen is displayed as the initial display screen; the initial display screen storage portion; and the judging portion, wherein the judging portion compares the information to specify the last display screen at the time of logout with the information stored in the initial display screen storage portion and judges whether or not the information to specify the last display screen is appropriate as information to specify an initial display screen at the time of next login, and when the judging portion judges that the last display screen at the time of logout is inappropriate as the information to specify the initial display screen, not the information to specify the last display screen at the time of logout but information to specify another screen in accordance with a predetermined condition is transmitted to the multi-functional peripheral included in the initial mode setting information as the information to specify the last display screen.

Another object of the present invention is to provide the authentication system, wherein the another screen in accordance with the predetermined condition is a previously determined screen to be displayed as an initial display screen, when the last display screen at the time of logout transmitted from the multi-functional peripheral is judged to be inappropriate as the information to specify the initial display screen.

Another object of the present invention is to provide the authentication system, wherein the multi-functional peripheral enables display change between hierarchies of a screen having a hierarchical structure in accordance with a predetermined operation, and when the information to specify the last display screen at the time of logout transmitted from the multi-functional peripheral is not consistent with the information stored in the initial display screen storage portion and when the information to specify the screen of the upper hierarchy of the last display screen has been stored in the initial display screen storage portion, the another screen in accordance with the predetermined condition is the screen of the closest hierarchy to the last display screen among the screens of the upper hierarchy of the last display screen.

Another object of the present invention is to provide the authentication system, wherein the authentication server stores in the storage portion the information to specify the last display screen at the time of logout in association with device information unique to a multi-functional peripheral, and the notifying portion for notifying the multi-functional peripheral of the initial mode setting information notifies the multi-functional peripheral of initial mode setting information corresponding to the device information unique to the multi-functional peripheral.

Another object of the present invention is to provide the authentication system, wherein the authentication server stores in the storage portion model information of the multi-functional peripheral in association with the information to specify the last display screen at the time of logout, and a notifying portion for notifying the multi-functional peripheral of the initial mode setting information notifies a multi-functional peripheral that the model information is consistent therewith of the initial mode setting information.

Another object of the present invention is to provide the authentication system, wherein the authentication server stores in the storage portion setting information of the multi-functional peripheral in association with the information to specify the last display screen at the time of logout, and a notifying portion for notifying the multi-functional peripheral of the initial mode setting information notifies the multi-functional peripheral of the setting information together with the initial mode setting information.

Another object of the present invention is to provide a multi-functional peripheral which is connected to an authentication server for performing authentication of login information input in a multi-functional peripheral, comprising: a notifying portion for notifying the authentication server of information to specify a last display screen at the time of logout of the multi-functional peripheral; a control portion for receiving, from the authentication server, initial mode setting information including the information to specify the last display screen and information to indicate that the last display screen is displayed as the initial display screen, and controlling to display the last display screen as an initial display screen after login based on the received initial mode setting information; an initial display screen storage portion for storing information to specify a screen capable of initially displaying at the time of login in advance; and a judging portion for comparing the information to specify the last display screen of the multi-functional peripheral with information stored in the initial display screen storage portion and judging whether or not the information to specify the last display screen is appropriate as information to specify an initial display screen at the time of login, wherein when the judging portion judges that the last display screen at the time of logout is inappropriate as the initial display screen, another screen in accordance with a predetermined condition is displayed.

Another object of the present invention is to provide the multi-functional peripheral, wherein the judging portion compares the information to specify the last display screen at the time of logout with the information stored in the initial display screen storage portion and judges whether or not the information to specify the last display screen is appropriate as information to specify an initial display screen at the time of next login, and notifies the authentication server of not the information to specify the last display screen at the time of logout but information to specify another screen in accordance with a predetermined condition as the information to specify the last display screen when the judging portion judges that the last display screen at the time of logout is inappropriate as the information to specify the initial display screen.

Another object of the present invention is to provide the multi-functional peripheral, wherein the another screen in accordance with the predetermined condition is a previously determined screen to be displayed as an initial display screen, when the last display screen at the time of logout is judged to be inappropriate as the information to specify the initial display screen.

Another object of the present invention is to provide the multi-functional peripheral, wherein the multi-functional peripheral enables display change between hierarchies of a screen having a hierarchical structure in accordance with a predetermined operation, and when the information to specify the last display screen at the time of logout is not consistent with the information stored in the initial display screen storage portion and when information to specify a screen of an upper hierarchy of the last display screen has been stored in the initial display screen storage portion, the another screen in accordance with the predetermined condition is a screen of the closest hierarchy to the last display screen among screens of the upper hierarchy of the last display screen.

Another object of the present invention is to provide the multi-functional peripheral, wherein the judging portion compares the information to specify the last display screen included in the initial mode setting information with the information stored in the initial display screen storage portion and judges whether or not the information to specify the last display screen is appropriate as information to specify an initial display screen at the time of login, and displays not the last display screen instructed by the initial mode setting information but another screen in accordance with a predetermined condition as the initial display screen at the time of login when the judging portion judges that the information to specify the last display screen included in the initial mode setting information is inappropriate as the information to specify the initial display screen.

Another object of the present invention is to provide the multi-functional peripheral, wherein the another screen in accordance with the predetermined condition is a previously determined screen to be displayed as an initial display screen, when the information to specify the last display screen included in the initial mode setting information is judged to be inappropriate as the information to specify the initial display screen.

Another object of the present invention is to provide the multi-functional peripheral, wherein the multi-functional peripheral enables display change between hierarchies of a screen having a hierarchical structure in accordance with a predetermined operation, and when the information to specify the last display screen included in the initial mode setting information is not consistent with the information stored in the initial display screen storage portion and when the information to specify the screen of the upper hierarchy of the last display screen has been stored in the initial display screen storage portion, the another screen in accordance with the predetermined condition is the screen of the closest hierarchy to the last display screen among the screens of the upper hierarchy of the last display screen.

Another object of the present invention is to provide an authentication server that is connected to and is able to communicate with a multi-functional peripheral and performs authentication of login information input in the multi-functional peripheral, comprising: a storage portion for storing information to specify a last display screen at the time of logout from the multi-functional peripheral that is given from the multi-functional peripheral; a notifying portion for notifying the multi-functional peripheral of initial mode setting information including the information to specify the last display screen and information to indicate that the last display screen is displayed as the initial display screen; an initial display screen storage portion for storing information to specify a screen capable of initially displaying at the time of login in advance; and a judging portion for comparing the information to specify the last display screen at the time of logout notified from the multi-functional peripheral with the information stored in the initial display screen storage portion and judging whether or not the information to specify the last display screen is appropriate as information to specify an initial display screen at the time of next login of the multi-functional peripheral, wherein when the judging portion judges that the last display screen at the time of logout is inappropriate as the information to specify the initial display screen, not the information to specify the last display screen at the time of logout but information to specify another screen in accordance with a predetermined condition is included in the initial mode setting information as the information to specify the last display screen to be transmitted to the multi-functional peripheral.

Another object of the present invention is to provide the authentication server, wherein the another screen in accordance with the predetermined condition is a previously determined screen to be displayed as an initial display screen, when the last display screen at the time of logout is judged to be inappropriate as the information to specify the initial display screen.

Another object of the present invention is to provide the authentication server, wherein the multi-functional peripheral enables display change between hierarchies of a screen having a hierarchical structure in accordance with a predetermined operation, and when the information to specify the last display screen that has been displayed at the time of logout is not consistent with the information stored in the initial display screen storage portion and when the information to specify the screen of the upper hierarchy of the last display screen has been stored in the initial display screen storage portion, the another screen in accordance with the predetermined condition is the screen of the closest hierarchy to the last display screen among the screens of the upper hierarchy of the last display screen.

Another object of the present invention is to provide the authentication server, wherein the information to specify the last display screen at the time of logout is stored in the storage portion in association with device information unique to a multi-functional peripheral, and a notifying portion for notifying the multi-functional peripheral of the initial mode setting information notifies to the multi-functional peripheral initial mode setting information corresponding to the device information unique to the multi-functional peripheral.

Another object of the present invention is to provide the authentication server, wherein model information of the multi-functional peripheral is stored in the storage portion in association with the information to specify the last display screen at the time of logout, and a notifying portion for notifying the multi-functional peripheral of the initial mode setting information notifies a multi-functional peripheral that the model information is consistent therewith of the initial mode setting information.

Another object of the present invention is to provide the authentication server, wherein setting information of the multi-functional peripheral is stored in the storage portion in association with the information to specify the last display screen at the time of logout, and a notifying portion for notifying the multi-functional peripheral of the initial mode setting information notifies the multi-functional peripheral of the setting information together with the initial mode setting information.

PREFERRED EMBODIMENTS OF THE INVENTION

Example 1

Figure 1:
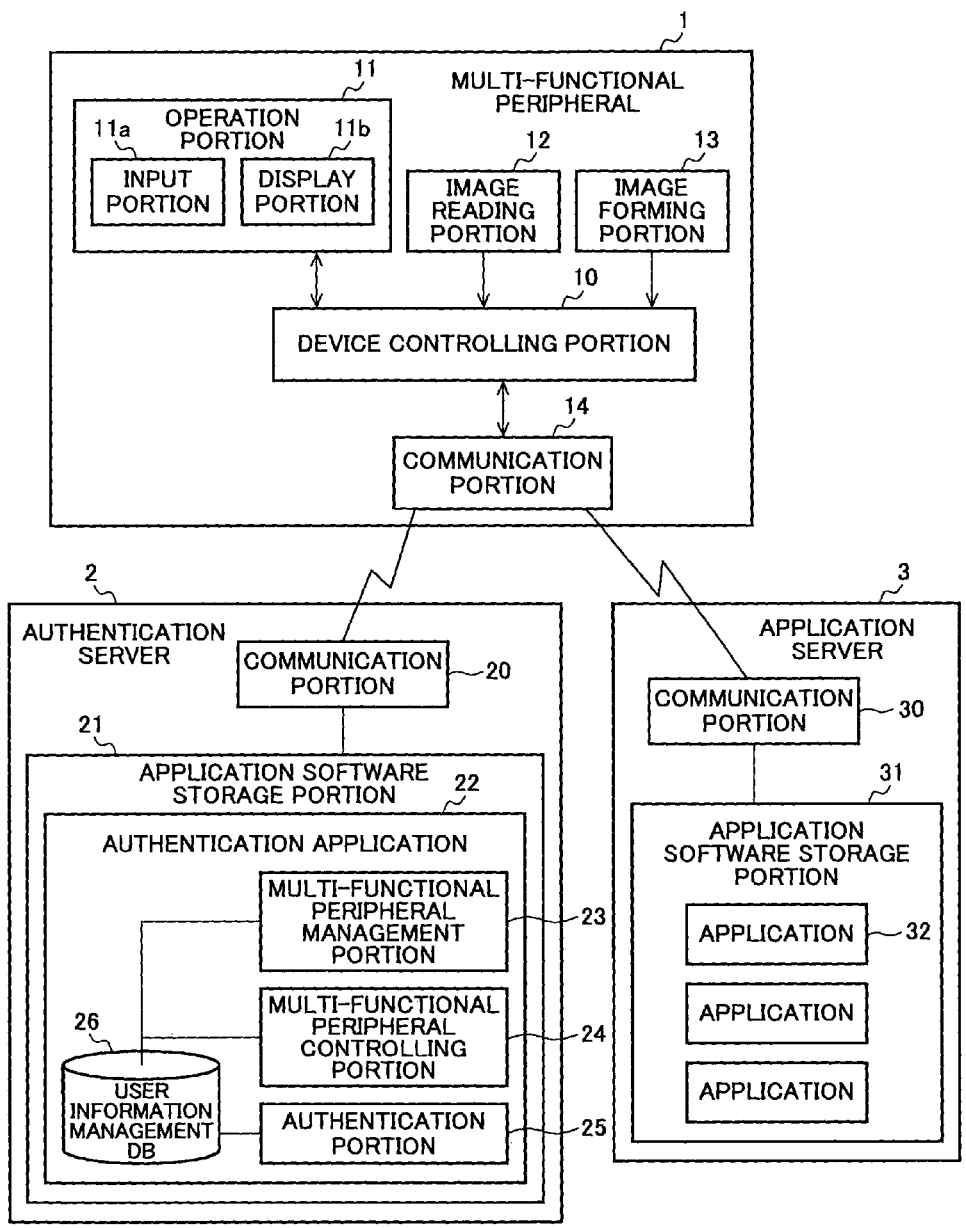
FIG. 1 is a block diagram illustrating a schematic configuration example of an authentication system according to an embodiment of the present invention.

FIG. 1 is a block diagram illustrating a schematic configuration example of an authentication system according to an embodiment of the present invention. The system shown in FIG. 1 is provided with a multi-functional peripheral 1, an authentication server 2 and an application server (external application server) 3. The authentication system according to the present invention includes at least the multi-functional peripheral 1 and the authentication server 2.

The multi-functional peripheral 1 is a digital multi-functional peripheral or an analogue multi-functional peripheral, and is provided with a device controlling portion 10, an operation portion 11, an image reading portion 12, an image forming portion 13 and a communication portion 14. The device controlling portion 10 controls each portion provided in the multi-functional peripheral 1. The operation portion 11 has an input portion 11a and a display portion 11b such as an LCD (Liquid Crystal Display). The input portion 11a has various input key groups and a touch panel for accepting user input provided in the display portion 11b.

The image reading portion 12 reads a document placed on a document platen or an automatic document feeder and inputs image data. The image forming portion 13 forms an image (printing) of image data input from the image reading portion 12 or image data input from an external PC via the communication portion 14 in a recording medium. The communication portion 14 communicates with an information processing apparatus via a network such as a wired LAN (Local Area Network) or a wireless LAN. Here, the authentication server 2 and the application server 3 are connected to the network as the information processing apparatus for communicating with.

The authentication server 2 is a server computer provided with a communication portion 20 and an application software storage portion 21. The communication portion 20 communicates with the multi-functional peripheral 1 via the network such as a wired LAN or a wireless LAN. The application software storage portion 21 stores an authentication application 22 for controlling the multi-functional peripheral 1.

The authentication application 22 is provided with a multi-functional peripheral management portion 23, a multi-functional peripheral controlling portion 24 and an authentication portion 25 as applications and is provided with a user information management database (DB) 26 as data. The multi-functional peripheral management portion 23 relates user information with the multi-functional peripheral 1. The multi-functional peripheral controlling portion 24 manages valid/invalid of each elemental function of the multi-functional peripheral 1. Each of the elemental functions will be described below. The authentication portion 25 carries out user authentication. The user information management DB 26 is a database in which user information is managed.

The device controlling portion 10 of the multi-functional peripheral 1 transmits between the authentication application 22 stored in the authentication server 2, operation information of a user input by the input portion 11*a* to the side of the authentication server 2 via the communication portion 14 and the communication portion 20. Further, the device controlling portion 10 causes the function of the authentication application 22 to answer and obtains the result of authentication processing thereof by exchanging information for controlling a device of a communication party and device control information serving as information responding thereto. This allows the multi-functional peripheral 1 to perform authentication processing in cooperation with the authentication application 22.

The application server 3 is a server computer provided with a communication portion 30 and an application software storage portion 31. The communication portion 30 communicates with the multi-functional peripheral 1 via the network such as a wired LAN or a wireless LAN. The application software storage portion 31 stores an application 32 for controlling the multi-functional peripheral 1. The application server 3 may be configured as an apparatus being physically the same as the authentication server 2. Moreover, the application server 3 and the authentication server 2 may be configured by incorporating a server program on a PC, respectively.

The device controlling portion 10 of the multi-functional peripheral 1 transmits, between the application 32 stored in the application server 3, operation information for the operation portion 11 to the side of the application server 3 via the communication portion 14 and the communication portion 30. Further, the device controlling portion 10 causes the function of the application 32 to answer and obtains the result of authentication processing thereof by exchanging device control information. This allows the multi-functional peripheral 1 to perform processing in cooperation with the application 32. One external application function corresponds to one application stored in the application server 3 and is able to be implemented in the multi-functional peripheral 1 for each application stored.

The operation information and the device control information described above are transmitted including device information of a device on the transmitting side so that a transmission source can be recognized on the receiving side. The device information is the information unique to the device and indicates the identification information for identifying the device from other devices. Illustrating the multi-functional peripheral 1, the device information is the identification information for identifying the multi-functional peripheral 1 from other devices (other multi-functional peripherals, the authentication server 2, etc.) and examples thereof include a device number (serial number) unique to the multi-functional peripheral 1 and a MAC (Media Access Control) address.

Figure 2:
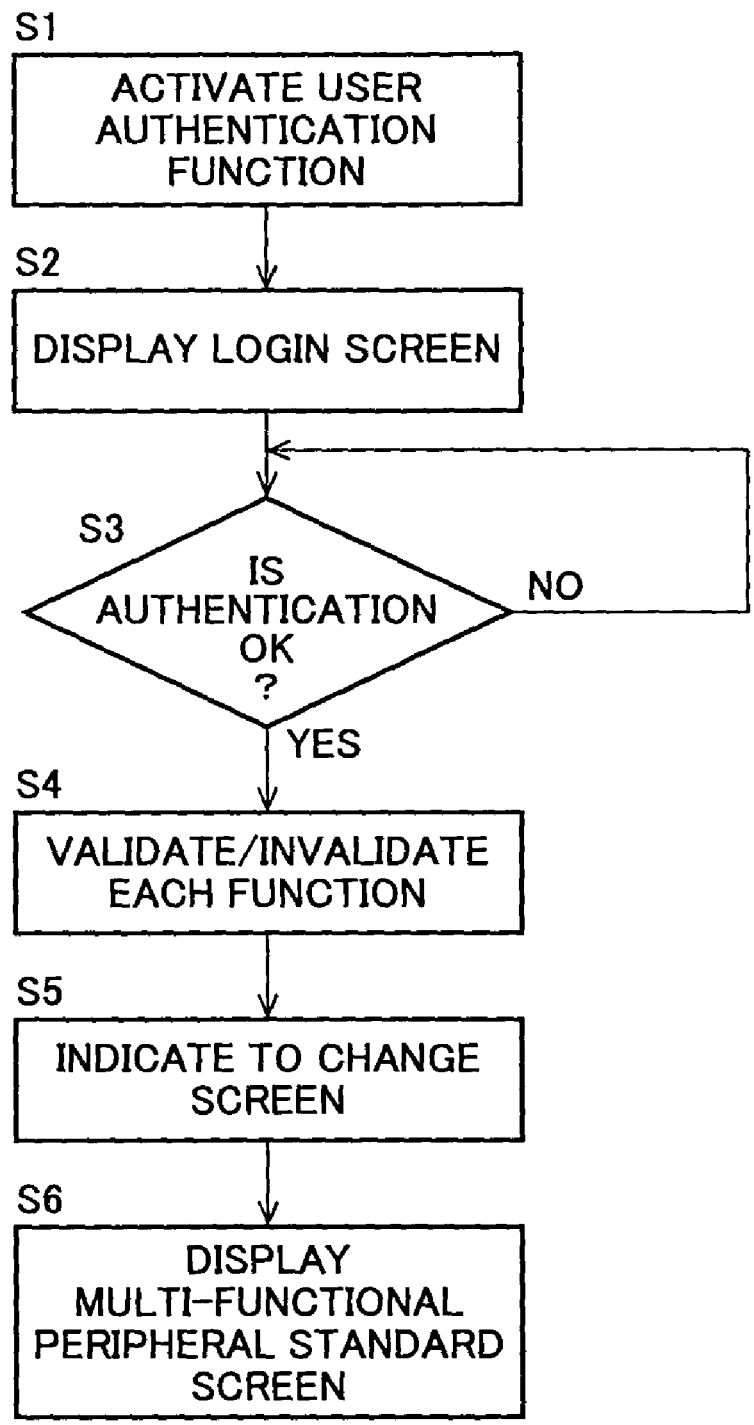
FIG. 2 is a flowchart for describing an example of processing for performing user authentication by a multi-functional peripheral and an authentication server.

FIG. 2 is a flowchart for describing an example of processing for performing user authentication by a multi-functional peripheral and an authentication system. A user performs a predetermined operation to the operation portion 11 of the multi-functional peripheral 1, thereby a user authentication function can be activated (step S1). In this case, the predetermined operation to the operation portion 11 is discriminated at a device controlling portion 17, and the user authentication function is activated by control of the device controlling portion 17.

In the multi-functional peripheral 1, when the user authentication function becomes available, the authentication server 2 is notified that the user authentication function is available, and a login screen (authentication screen) is obtained from the authentication server 2. Then, the multi-functional peripheral 1 displays the login screen obtained from the authentication server 2 on the display portion 11*b* (step S2).

Figure 3:
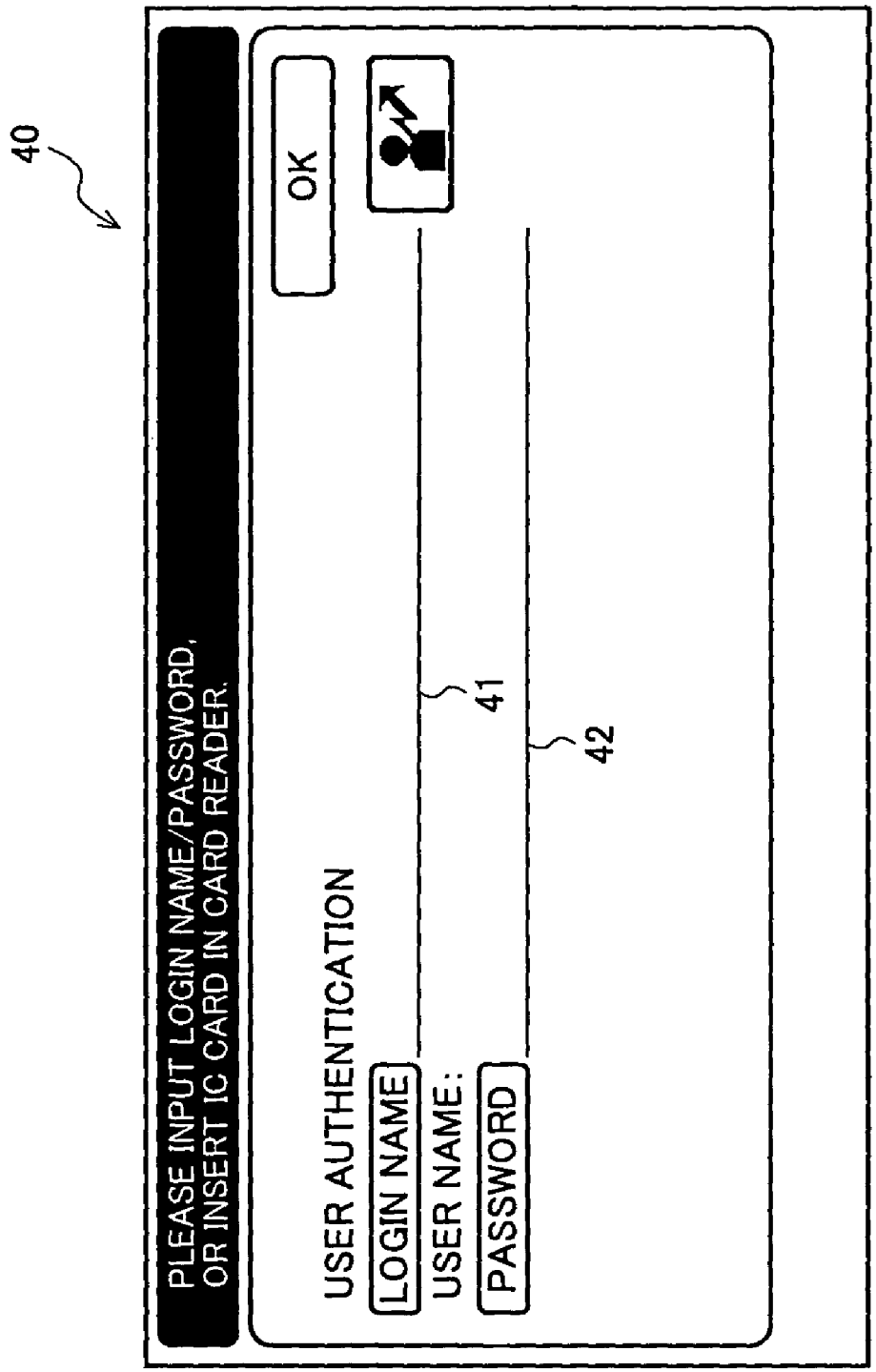
FIG. 3 is a diagram illustrating an example of a login screen displayed in the multi-functional peripheral.

FIG. 3 is a diagram illustrating an example of a login screen displayed in the multi-functional peripheral 1. A login screen 40 displayed in the multi-functional peripheral 1 has a login name input portion 41 and a password input portion 42. A user operates the operation portion 11 to input a login name and a password in the login screen 40, thereby performs login. Additionally, when the user authentication is performed by an IC (Integrated Circuit) card etc., the login screen 40 also performs display for urging to insert the IC card into a card reader.

Description will be returned to FIG. 2. After a login screen is displayed at the step S2, a user inputs a login name and a password in a login screen. Alternatively, password information is input with use of an IC card reader. Such a login name and a password correspond to login information (authentication information).

The device controlling portion 10 that receives input login information requires user authentication processing for the authentication server 2, and the authentication application 22 of the authentication server 2 that has received the request determines whether or not the authentication has been completed successfully (step S3).

The authentication server 2 returns an authentication error to the multi-functional peripheral 1 when the authentication has failed (step S3—NO). The device controlling portion 10 of the multi-functional peripheral 1 displays on the display portion 11*b* a login screen transmitted concurrently with the authentication error (or a login screen that is held in the multi-functional peripheral 1 until the authentication has been completed successfully) to urge the user to perform re-entry of the login information. This allows the multi-functional peripheral 1 to perform the user authentication in cooperation with the authentication server 2.

When the authentication has been completed successfully (step S3—YES), the multi-functional peripheral controlling portion 24 of the authentication server 2 closes the login screen and transmits a control command for validating or invalidating each function of the multifunctional peripheral to the multi-functional peripheral 1. The multi-functional peripheral 1 that has received the control command closes the login screen and validates or invalidates each function of the multi-functional peripheral 1 in accordance with the control command (step S4).

Next, the multi-functional peripheral controlling portion 24 of the authentication server 2 instructs the multi-functional peripheral 1 to change a screen (step S5). Here, the multi-functional peripheral controlling portion 24, based on login information of a user whose authentication is OK, instructs the multi-functional peripheral 1 to change display of the multi-functional peripheral 1 in accordance with last display screen information that has been displayed on the multi-functional peripheral when the user logged out last time. Such instruction information serves as initial mode setting information. The initial mode setting information includes information to specify a last display screen at the time of logout from the multi-functional peripheral and instruction information for displaying the last display screen on the multi-functional peripheral 1 at the time of login.

In the multi-functional peripheral 1 that has received the instruction to change a screen, a standard screen instructed from among standard screens held in an internal memory of the multi-functional peripheral 1 is displayed. Such a standard screen becomes an initial display screen to be displayed by the multi-functional peripheral 1 after login.

For example, in the case of functions unique to the multi-functional peripheral such as a copy and a scan, since a setting screen of each function is prepared as a standard screen inside the multi-functional peripheral 1, information (command) to display the setting screen that has been prepared is transmitted to the multi-functional peripheral 1 from the authentication server 2. The multi-functional peripheral 1 that received such information to display the setting screen obtains the setting screen according to the information and displays it as an initial display screen.

On the other hand, in the case of logging out while operating an application which is not a function unique to the multi-functional peripheral 1, an operation screen of the application is displayed at the time of next login. In this case, the information that controls the multi-functional peripheral 1 to obtain a display screen of the application that is described in an HTML or the like is transmitted to the multi-functional peripheral 1 from the authentication server 2. In the multi-functional peripheral 1, upon receiving the information, the display screen of the application is obtained from the application server 3 to be displayed as an initial display screen.

Figure 4:
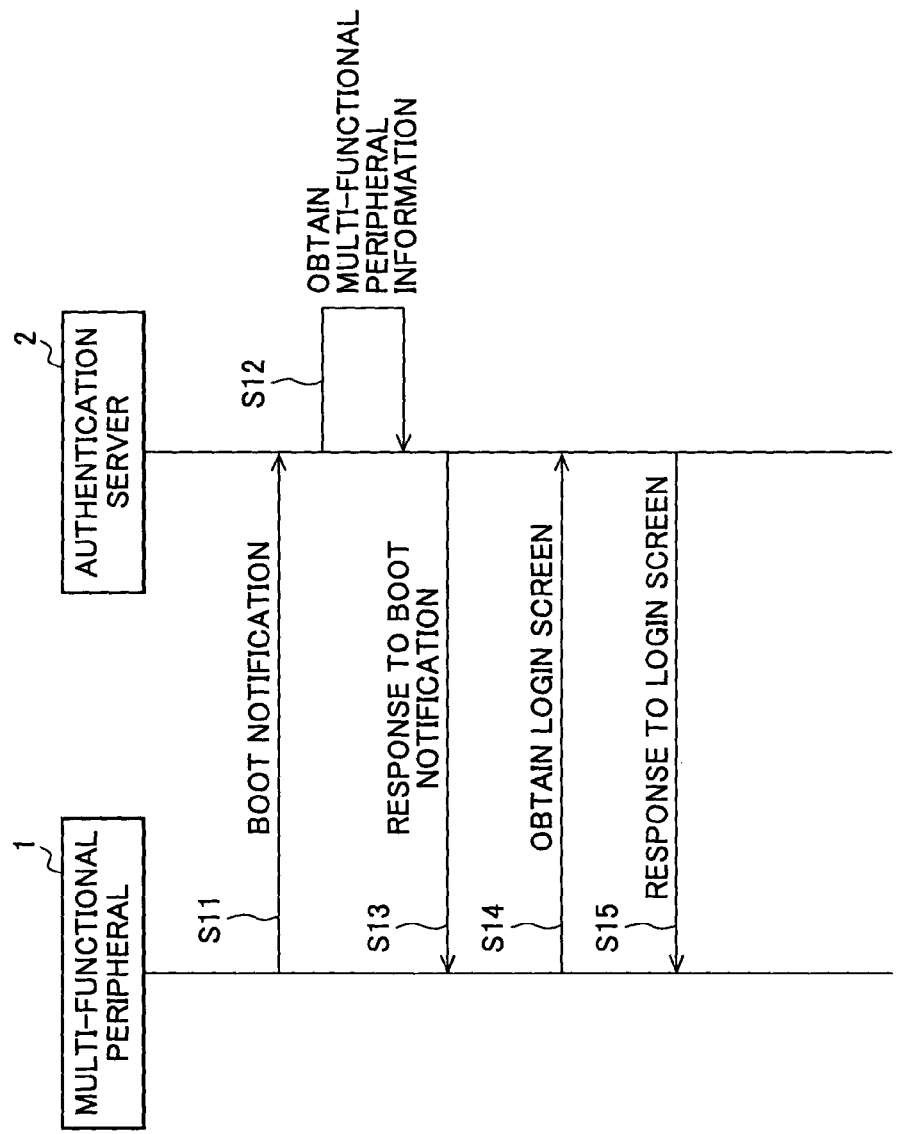
FIG. 4 is a diagram illustrating an example of processing for dealing the multi-functional peripheral to be managed by the authentication server.

FIG. 4 is a diagram illustrating an example of processing for dealing the multi-functional peripheral to be managed by the authentication server, and a diagram for describing the login screen display processing at the step S2 of FIG. 2 in more detail. The login screen displayed on the multi-functional peripheral 1 is obtained from the authentication server 2, however, in the case of obtaining the login screen in the multi-functional peripheral 1, it is necessary for the authentication server 2 to regard the multi-functional peripheral 1 as an authentication target.

When the user authentication function becomes available in the multi-functional peripheral 1, the device controlling portion 10 of the multi-functional peripheral 1 transmits boot notification to the authentication server 2 (step S11). The boot notification includes the device information of the multi-functional peripheral 1 and information indicating that the user authentication function has been made available.

The transmission of the boot notification is also executed when the user authentication function is changed from valid to invalid. Here, the boot notification including the device information of the multi-functional peripheral 1 and information indicating that the user authentication function has been invalidated is transmitted to the authentication server 2 from the multi-functional peripheral 1. Additionally, even in the case where the user authentication function has been already available when the multi-functional peripheral 1 boots, the boot notification is transmitted to the authentication server 2.

When the authentication application 22 which operates on the authentication server 2 receives the boot notification via the communication portion 20, the multi-functional peripheral management portion 23 of the authentication application 22 obtains multi-functional peripheral information from an internal memory using the device information as a key (step S12).

The multi-functional peripheral information includes device information of the multi-functional peripheral, information indicated by the device information indicating whether the multi-functional peripheral is powered on or off and information indicating whether or not the multi-functional peripheral indicated by the device information is regarded as an authentication target.

The multi-functional peripheral management portion 23 of the authentication server 2 rewrites the multi-functional peripheral information so as to regard the multi-functional peripheral 1 as the authentication target under the condition that the user authentication function has been already available when it detects that the power is supplied to the multi-functional peripheral 1 among multi-functional peripherals managed by the multi-functional peripheral information by means of the obtained multi-functional peripheral information.

On the other hand, when detecting that the user authentication function of the multi-functional peripheral 1 is changed from invalid to valid by means of the obtained multi-functional peripheral information, the multi-functional peripheral management portion 23 (I) rewrites the multi-functional peripheral information regarding the multi-functional peripheral 1 as the authentication target (rewrites from invalid to valid) or (II) creates multi-functional peripheral information from the device information by newly adding the multi-functional peripheral 1 as the authentication target. Such processing allows the multi-functional peripheral management portion 23 to add the multi-functional peripheral 1 as the authentication target.

When detecting that another multi-functional peripheral is powered, the multi-functional peripheral management portion 23 may exclude the multi-functional peripheral which has been the authentication target so far from the authentication target, but it is preferable that a plurality of multi-functional peripherals remain the authentication target simultaneously so that a plurality of multi-functional peripherals are corresponded.

Further, when the boot notification including information indicating that the user authentication function has been invalidated is received, the multi-functional peripheral information may be rewritten from valid to invalid so as to exclude the multi-functional peripheral 1 from the authentication target or the multi-functional peripheral information itself of the multi-functional peripheral 1 may be deleted.

Next, the authentication application 22 of the authentication server 2 returns a response to the boot notification (information indicating that, for example, the user authentication function is turned on and the boot can be confirmed) to the multi-functional peripheral 1 (step S13). The device controlling portion 10 of the multi-functional peripheral 1 that has received the response requests obtainment of a login screen to the authentication server 2 (step S14).

The authentication application 22 of the authentication server 2, corresponding to the request of the login screen, reads out the login screen from the internal memory of the authentication server 2 to return to the multi-functional peripheral 1 (step S15). The device controlling portion 10 of the multi-functional peripheral 1 causes the display portion 11*b* to display the received login screen as an operation screen.

When a user inputs login information (login name and password) onto the login screen displayed by the multi-functional peripheral 1, the input login information is transmitted to the authentication server 2 from the multi-functional peripheral 1. The authentication portion 25 of the authentication server 2 performs the user authentication by checking the login information transmitted from the multi-functional peripheral 1 with the accumulated information of a user information management database 27.

Figure 5:
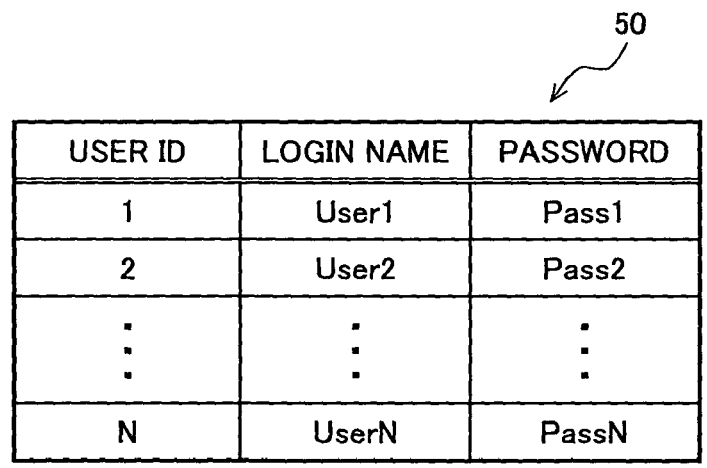
FIG. 5 is a diagram illustrating an example of a user management table managed by a user information management DB of the authentication server.

FIG. 5 is a diagram illustrating an example of a user management table managed by a user information management DB of the authentication server. A user management table 50 of FIG. 5 is included in the user information management DB 26 and stored as each user authentication information in association with a login name and a password for each user ID.

The login information input by the user in the multi-functional peripheral 1 is transmitted to the authentication server 2 from the multi-functional peripheral 1. The authentication portion 25 checks the received login information with the user management table 50 to carry out the authentication based on whether or not there is user authentication information in accordance with the login information in the user management table 50. When the authentication is OK, the multi-functional peripheral controlling portion 24 of the authentication server 2 obtains from the user information management DB 26 information of the last display screen displayed at the time of previous logout by a user who logs in, and instructs the multi-functional peripheral 1 to change a screen. At this time, when it is judged that the last display screen at the time of previous logout is inappropriate as an initial display screen at the time of next login, a predetermined initial display screen is displayed in replacement of an actual last display screen, or a screen in an upper hierarchy of the last display screen is displayed. The details of such processing are described below.

Figure 6:
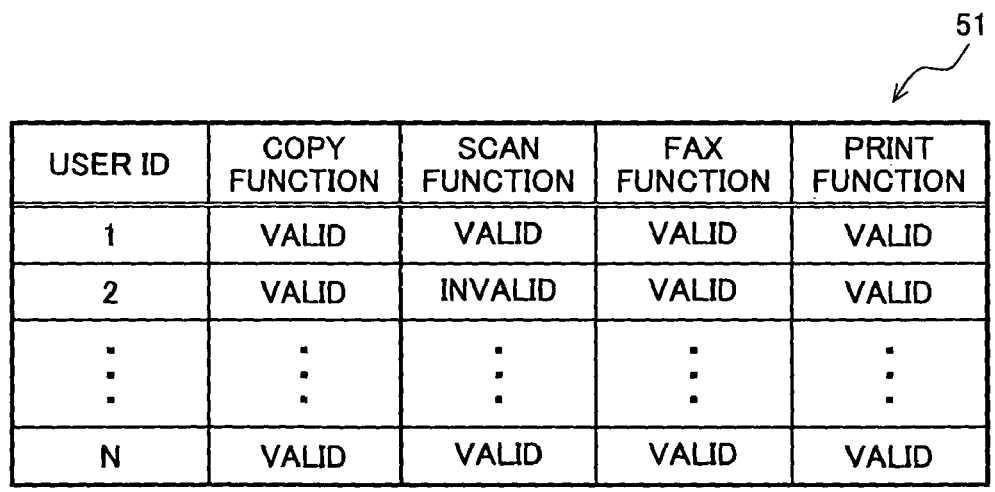
FIG. 6 is a diagram illustrating an example of a function valid/invalid management table managed by the user information management DB of the authentication server.

FIG. 6 is a diagram illustrating an example of a function valid/invalid management table managed by the user information management DB of the authentication server, and a diagram for describing valid/invalid processing at the step S4 of FIG. 2 in more detail.

A function valid/invalid management table 51 is included in the user information management DB 26, and associated with information indicating valid/invalid of each function (elemental function) of the multi-functional peripheral for each user ID. Note that, the information indicating valid/invalid is information indicating user restriction to the function and is able to be said as authority information.

The multi-functional peripheral controlling portion 24 of the authentication server 2 manages the valid/invalid information for each elemental function described in the function valid/invalid management table 51 by rewriting corresponding to a changing request from the side of the multi-functional peripheral 1. Rewriting of the valid/invalid information may be able to be only executed when an administrator user who has rewriting authority logs in. Further, the multi-functional peripheral controlling portion controls to restrict each elemental function in the multi-functional peripheral 1 based on the managed valid/invalid information.

In the function valid/invalid management table 51, elemental functions are managed by classifying into large categories (categories of operation modes here) such as a copy function, a scan function, a fax function and a print function. Additionally, in the case of scan, for example, classification into specific categories such as a function of scan for e-mail transmission and a function of scan for FTP (File Transfer Protocol) transmission may be managed. Further, the valid/invalid information may be managed for each specific setting such as management of the valid/invalid information by classifying into a category such as color information (monochrome/full-color).

When each function of the multi-functional peripheral 1 is validated/invalidated after the authentication server 2 completes authentication of the multi-functional peripheral 1 successfully (step S4 of FIG. 2), the multi-functional peripheral controlling portion 24 of the authentication server 2 refers to the function valid/invalid management table 51 based on the login information and discriminates whether each function of the multi-functional peripheral 1 is validated or invalidated for the user indicated by the login information.

More specifically, using the user ID logged in as a key, the valid/invalid information corresponding to the user ID is extracted from the function valid/invalid management table 51 and valid/invalid is discriminated for each function determined by the user based on the extracted valid/invalid information.

Subsequently, the multi-functional peripheral controlling portion 24 generates a control command to, for the user, activate the function that is valid and invalidate the function that is invalid to transmit to the multi-functional peripheral 1. The device controlling portion 10 of the multi-functional peripheral 1 that has received the control command validates or invalidates each function of the multi-functional peripheral 1. In this manner, the authentication server 2 is able to control whether or not each user is permitted to use the functions of the multi-functional peripheral itself (for example, a copy function, a scan function, a fax function, a print function, etc.) and the external application function.

Figure 7:
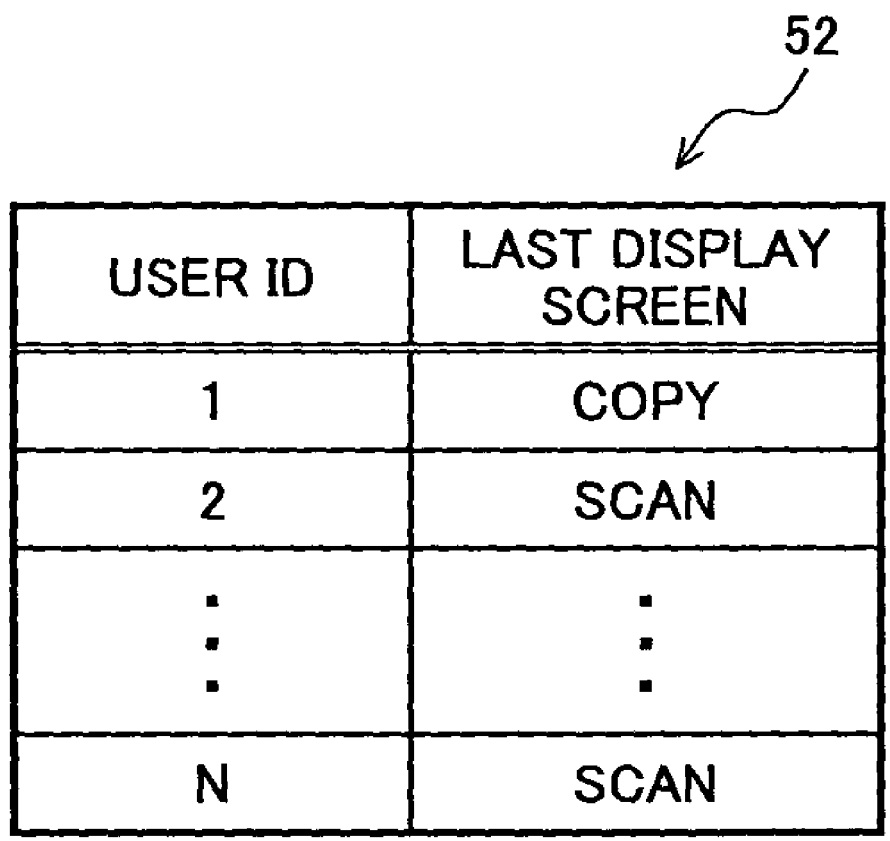
FIG. 7 is a diagram illustrating an example of a last display screen management table managed by the user information management DB of the authentication server.

Next, description will be given for processing for displaying an initial display screen after logging in of the multi-functional peripheral. FIG. 7 is a diagram illustrating an example of a last display screen management table managed by the user information management DB of the authentication server. The last display screen information is stored in the last display screen management table 52 in association with the user ID. The last display screen is a display screen that is lastly displayed at the time of previous logout for each of the users. More specifically, a screen that is lastly displayed just before logout from login to logout performed by a user is corresponded.

The last display screen information managed by the last display screen management table 52 is not screen data itself but information from which any screen is able to be specified from among the screens that has been held in the internal memory of the multi-functional peripheral 1 (standard screen). The last display screen information is received in the multi-functional peripheral 1 so that the multi-functional peripheral 1 reads out a corresponding screen from an internal memory of itself according to the last display screen information to display on the display portion 11*b*.

The last display screen information of the last display screen management table 52 is appropriately updated for each logout of a user. For example, in an example of FIG. 7, a last display screen that has been displayed by a user of a user ID "1" at the time of previous logout is a setting screen of a copy function. Additionally, last display screens of users of user IDs "2" and "N" are setting screens of a scan function.

At this time, when a screen has a hierarchical structure for each function of the multi-functional peripheral, information to specify to which hierarchy of functions the screen belongs is able to be imparted. This makes it possible to manage specified screen information displayed in the multi-functional peripheral 1 with the last display screen management table.

Figure 8:
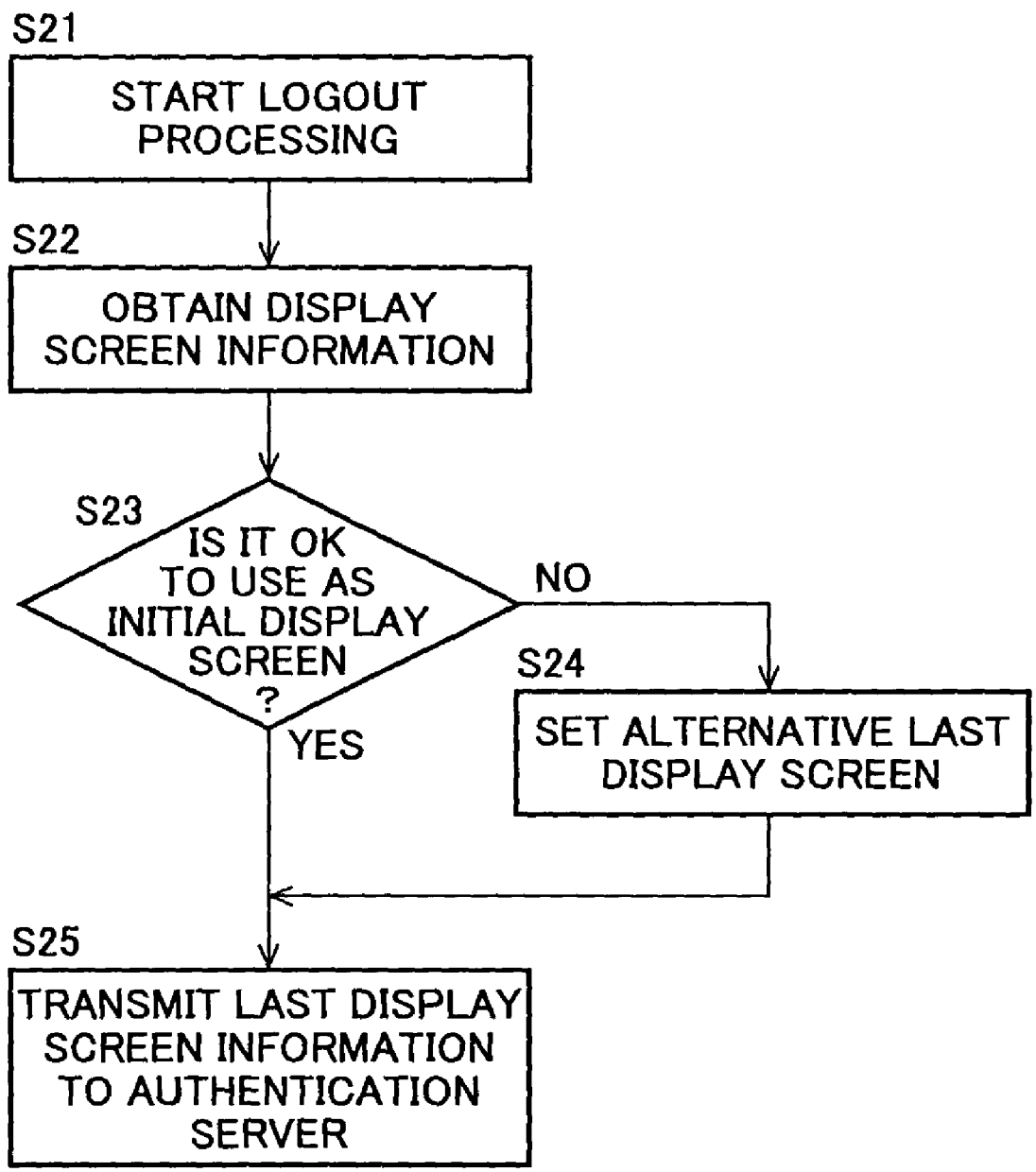
FIG. 8 is a flowchart illustrating an example of processing at the time of logout from the multi-functional peripheral.

FIG. 8 is a flowchart illustrating an example of processing at the time of logout from the multi-functional peripheral. The device controlling portion 10 of the multi-functional peripheral 1 starts logout processing of a user corresponding to a predetermined user operation for the operation portion 11 (step S21). Then, the multi-functional peripheral 1 obtains display screen information that has been displayed by the multi-functional peripheral 1 at the time of logout (last display screen information) (step S22) to discriminate whether to be usable as an initial display screen at the time of next login (step S23). Here, it is checked whether the obtained display screen information at the time of previous logout matches up with information of an initial display screen table. The display screen information is not image data of a display screen itself but information from which any standard screen is able to be specified from among standard screens that are prepared so as to be able to be displayed on the multi-functional peripheral. Further, the above-described initial display screen table is a table that previously stores information to specify a screen capable of initially displaying at the time of logging in the multi-functional peripheral 1.

Figure 9:
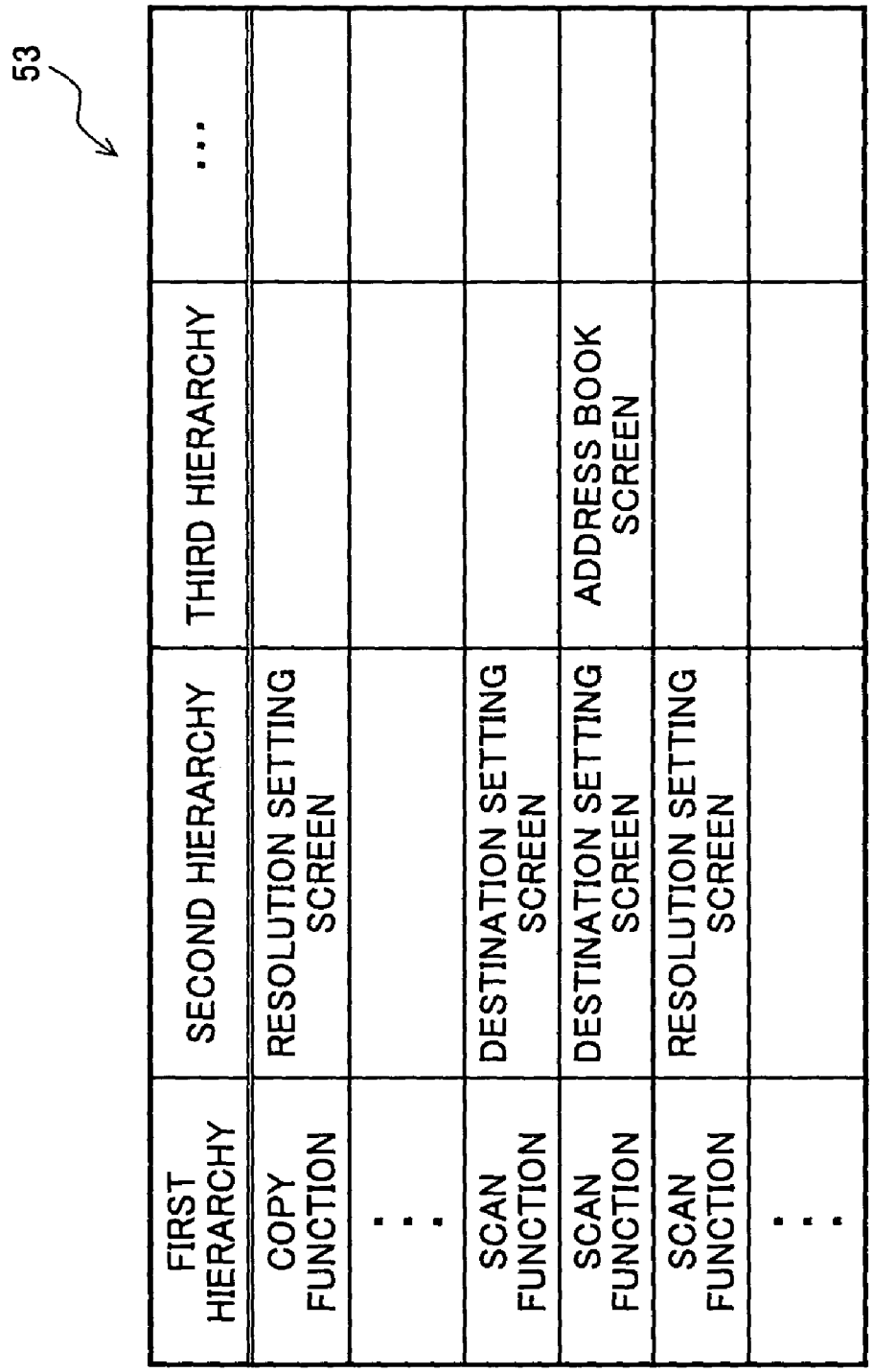
FIG. 9 is a diagram illustrating an example of a setting of an initial display screen table.

FIG. 9 is a diagram illustrating an example of a setting of an initial display screen table. In this example, a standard screen configured in multiple hierarchies such as a first hierarchy, a second hierarchy, a third hierarchy, etc., is set in the initial display screen management table 53.

For example, when the first hierarchy is a setting screen of a copy function, a screen of the second hierarchy is a resolution setting screen of a copy. Further, when the first hierarchy is a setting screen of a scan function, a screen of the second hierarchy includes a destination setting screen and a resolution setting screen of the scanned image data, and additionally, a screen of the third hierarchy which is a low layer of the destination setting screen includes an address book screen.

The device controlling portion 10 of the multi-functional peripheral 1, when a last display screen displayed at the time of previous logout is consistent with a screen that has been recorded in the initial display screen management table 53, judges that the display screen at the time of logout is usable as an initial display screen at the time of next login.

The initial display screen management table 53 is stored and held in a memory of the device controlling portion 10 of the multi-functional peripheral 1 or another memory (not shown). Such a memory corresponds to an initial display screen storage portion of the present invention.

Description will be returned to FIG. 8. When the last display screen at the time of previous logout at the step S23 is described in the initial display screen management table 53 and usable as an initial display screen, the multi-functional peripheral 1 notifies the authentication server of last display screen information by regarding the display screen as a last display screen (step S25).

On the other hand, when the last display screen at the time of logout at the step S23 is not usable as the initial display screen, the multi-functional peripheral 1 sets not the screen displayed at the time of logout but a predetermined screen as an alternative last display screen (step S24), then notifies the authentication server of the screen information as the last display screen information.

Figure 10:
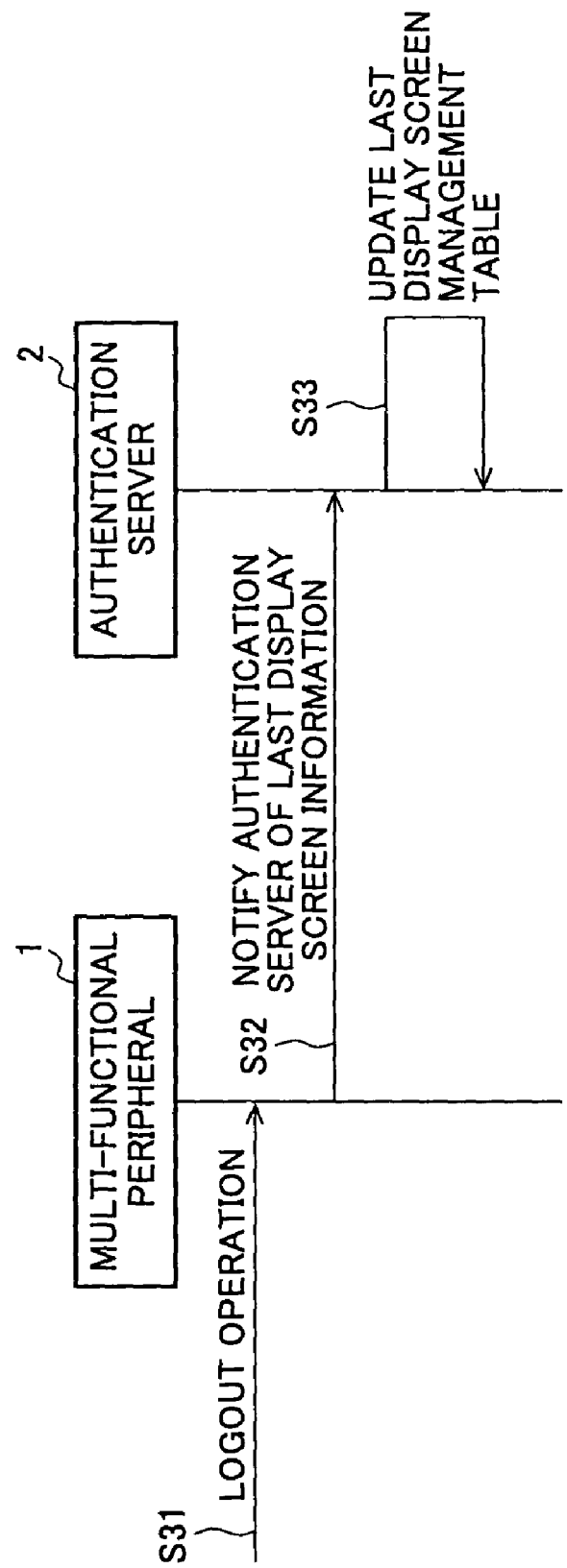
FIG. 10 is a diagram for describing an example of processing for updating the last display screen management table in the authentication server.

FIG. 10 is a diagram for describing an example of processing for updating a last display screen management table in the authentication server. When a user performs a predetermined logout operation for the multi-functional peripheral 1 (step S31), the multi-functional peripheral 1 performs logout processing and notifies the authentication server 2 of last display screen information at the time of logout (step S32). Such processing is executed according to the flow of FIG. 8, for example. The authentication server 2 that receives the notification of the last display screen information updates the last display screen management table 52 of the user information management DB 26 (step S33).

In this manner, in the first example according to the present invention, the multi-functional peripheral 1 compares information to specify a last display screen at the time of logout with information stored in the initial display screen management table 53 to judge whether or not the information to specify the last display screen is appropriate as information to specify an initial display screen at the time of next login. The judging portion corresponds to the device controlling portion 10. Then, when the judging portion judges that the last display screen at the time of logout is inappropriate as the information to specify the initial display screen, the judging portion notifies the authentication server 2 of not the information to specify the last display screen at the time of logout but the information to specify a screen in accordance with a predetermined condition as information to specify the last display screen.

Another screen in accordance with the above-described predetermined condition is, in the present example, a screen previously determined for displaying as an initial display screen when it is judged that the last display screen at the time of logout is inappropriate as the information to specify the initial display screen.

The authentication server 2 manages the information to specify the last display screen sent from the multi-functional peripheral 1 in the last display screen management table 52, and notifies the multi-functional peripheral 1 of the information to specify a last display screen of the user when a user logs in the multi-functional peripheral next time and is able to cause the multi-functional peripheral 1 to display the screen.

In the present example, this makes it possible to prevent an inappropriate screen from being displayed by sending a default screen that is previously set to the authentication server as a last screen when the last display screen at the time of logout from the multi-functional peripheral is inappropriate as the initial display screen at the time of next login. Further, in the case where the received initial mode setting information is inappropriate as the initial display screen including the case where the initial mode setting information of a different multi-functional peripheral is sent from the authentication server, it is possible to prevent the inappropriate screen from being displayed by displaying a previously determined screen as the initial display screen.

Additionally, even in the case where a plurality of different multi-functional peripherals are managed by the authentication server, a unified policy as a system is able to be controlled on the side of the authentication server.

Example 2

In the above-described first example, in the case where the last display screen at the time of logout from the multifunctional peripheral 1 is not able to be used as the initial display screen at the time of next login, a previously determined last display screen is sent to the authentication server 2. On the contrary, in a second example, in the case where the last display screen at the time of logout from the multi-functional peripheral 1 is not able to be used as the initial display screen at the time of next login, screen information which corresponds to an upper hierarchy of the last display screen is used as the alternative screen.

The multi-functional peripheral 1 transmits the last display screen information at the time of logout to the authentication server 2 when the multi-functional peripheral 1 logs out, similarly to the example 1. In the present example, here, the multi-functional peripheral 1 compares the last display screen information obtained through the logout with the initial display screen management table 53 shown in FIG. 9. When the last display screen information is consistent with screen information of the initial display screen management table 53, the multi-functional peripheral 1 notifies the authentication server 2 that the last display screen information at the time is used as the initial display screen at the time of next login.

On the other hand, when the last display screen information at the time of logout is not consistent with the screen information of the initial display screen management table 53, the multi-functional peripheral 1 retrieves whether or not there is a screen of an upper hierarchy of the last display screen information in the initial display screen management table 53. In this case, the last display screen information requires the information from which the last display screen at the time of logout of the multi-functional peripheral 1 is able to be specified and also information from which a screen of an upper hierarchy thereof is able to be specified.

In the case where there is the screen of the upper hierarchy of the last display screen information in the initial display screen table, an image of the lowest hierarchy among the screens of the upper hierarchy (an image which is deep in a hierarchy) is used as the initial display screen, and the multi-functional peripheral 1 transmits such screen information to the authentication server 2 as the last display screen information. Processing on the side of the authentication server 2 is the same as that of the first example.

In this manner, in the second example according to the present invention, the multi-functional peripheral 1 compares the information to specify the last display screen at the time of logout with the information stored in the initial display screen management table 53, and judges whether or not the information to specify the last display screen is appropriate as the information to specify the initial display screen at the time of next login. Then, when a judging portion judges that the last display screen at the time of logout is inappropriate as the information to specify the initial display screen, it notifies the authentication server 2 of not the information to specify the last display screen at the time of logout but the information to specify a screen in accordance with a predetermined condition as information to specify the last display screen.

Another screen in accordance with the above-described predetermined condition is a screen of the closest hierarchy to the last display screen among the screens of the upper hierarchy of the last display screen when the information to specify the last display screen at the time of logout is not consistent with the information stored in the initial display screen management table 53 and when the information to specify the screen of the upper hierarchy of the last display screen has been stored in the initial display screen management table 53.

The authentication server 2 manages the information to specify the last display screen which was given from the multi-functional peripheral 1 in the last display screen management screen 52, and it notifies the multi-functional peripheral 1 of the information to specify the last display screen of the user and is able to display the screen by the multi-functional peripheral 1 when the user logs in the multi-functional peripheral next time.

In this manner, in the present example, when the last display screen at the time of logout from the multi-functional peripheral is inappropriate as the initial display screen at the time of next login, by notifying a screen of an upper hierarchy which is closest to the last display screen as the last screen, the convenience is able to be further improved. Additionally, in the case where the received initial mode setting information is inappropriate as the initial display screen, such as the case where initial mode setting information of a different multi-functional peripheral is given from the authentication server, a screen close to the received initial mode information is displayed as the initial display screen so that convenience is able to be further improved. Moreover, even in the case where a plurality of different multi-functional peripherals are managed by the authentication server, a unified policy as a system is able to be controlled on the side of the authentication server.

Example 3

In the above first and second examples, although the processing for comparing the last display screen information with the information of the initial display screen is performed at the time of logout, in the third example, the same processing is performed at a time of instructing to change a screen in logging in.

Figure 11:
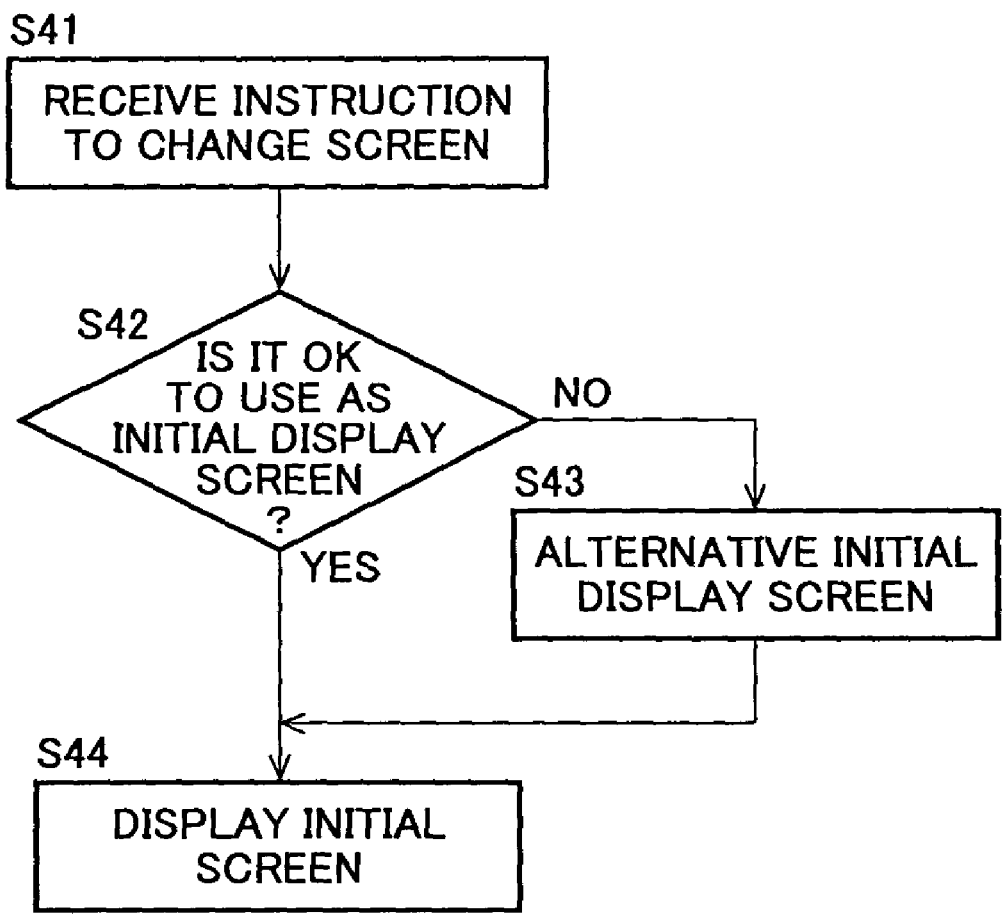
FIG. 11 is a flowchart for describing an example of screen switching processing at the time of login.

FIG. 11 is a flowchart for describing an example of screen switching processing at the time of login. The multi-functional peripheral 1, when authentication has been completed successfully by the login, receives an instruction to change a screen that has been transmitted from the authentication server 2 (step S41). The instruction to change a screen transmitted from the authentication server 2 is the same as the instruction to change a screen which is transmitted from the authentication server 2 to the multi-functional peripheral 1 when authentication has been completed successfully in the first example (step S5 in FIG. 2, for example). Here, the authentication server 2 holds the last display screen information transmitted from the multi-functional peripheral 1 at the time of logout of the multi-functional peripheral 1 for each user, and at the time of next login, transmits to the multi-functional peripheral 1 an instruction to display a screen which is specified by the last display screen information as an initial display screen (initial mode setting information).

The multi-functional peripheral 1, when receiving the instruction to change the screen, judges whether the instructed screen is usable as the initial display screen (step S42). The multi-functional peripheral 1 checks whether or not the initial display screen is usable is confirmed, similarly to the example 1, according to whether the last display screen information transmitted from the authentication server 2 is consistent with the information in the initial display screen management table 53 (step S23 in FIG. 8, for example).

When the last display screen information transmitted from the authentication server 2 is the information of a screen usable as the initial display screen, the multi-functional peripheral 1 reads out the screen from an internal memory to be displayed on the display portion 11*b*. On the other hand, when the last display screen information is the information of a screen which is not usable as the initial display screen, the multi-functional peripheral 1 displays, as an alternative screen, a previously determined screen on the display portion 11*b* as an initial display screen.

Note that, in the present example, in replacement of the processing of displaying the alternative screen, similarly to the second example, when the last display screen information transmitted from the authentication server 2 is not in the initial display screen management table 53, and when the screen information of the upper hierarchy of the last display screen is present in the initial display screen management table 53, an image of the lowest hierarchy among the screens of the upper hierarchy thereof (an image deep in a hierarchy) may be displayed as the initial display screen.

In this manner, in the third example according to the invention, the multi-functional peripheral 1 compares the information to specify the last display screen that has been transmitted from the authentication server by the initial mode setting information when authentication has been completed successfully at the time of login with the information stored in the initial display screen management table 53, and judges whether or not the information to specify the last display screen is appropriate as the information to specify the initial display screen at the time of login. Then, when the last display screen of the initial mode setting information is judged to be inappropriate as the information to specify the initial display screen by the judging portion, not the information to specify the last display screen at the time of logout but a screen in accordance with a predetermined condition is displayed on the display portion 11*b*.

Another screen in accordance with the predetermined condition may be a predetermined screen or may be a screen of the closest hierarchy to the last display screen among screens of an upper hierarchy of the last display screen, when the information to specify the last display screen at the time of logout is not consistent with the information stored in the initial display screen management table 53 and when the information to specify the screen of the upper hierarchy of the last display screen has been stored in the initial display screen management table 53.

In this manner, in the present example, when the last display screen indicated by the authentication server at the time of logging in the multi-functional peripheral is inappropriate as the initial display screen, by notifying of a predetermined screen or a screen of an upper hierarchy which is closest to the last display screen as the last screen, the convenience is able to be further improved. Additionally, in the case where the received initial mode setting information is inappropriate as the initial display screen such as the case where initial mode setting information of a different multi-functional peripheral is given from the authentication server, a screen close to the received initial mode information is displayed as the initial display screen so that the convenience is able to be further improved. Moreover, even in a case where a plurality of different multi-functional peripherals are managed by the authentication server, a unified policy as a system is able to be controlled on the side of the authentication server.

Example 4

In the above examples 1 to 3, the judgment of whether or not the last display screen at the time of logout is appropriate as the initial display screen at the time of next login was performed in the multi-functional peripheral 1. In the present example, such judgment is performed in the authentication server 2.

Figure 12:
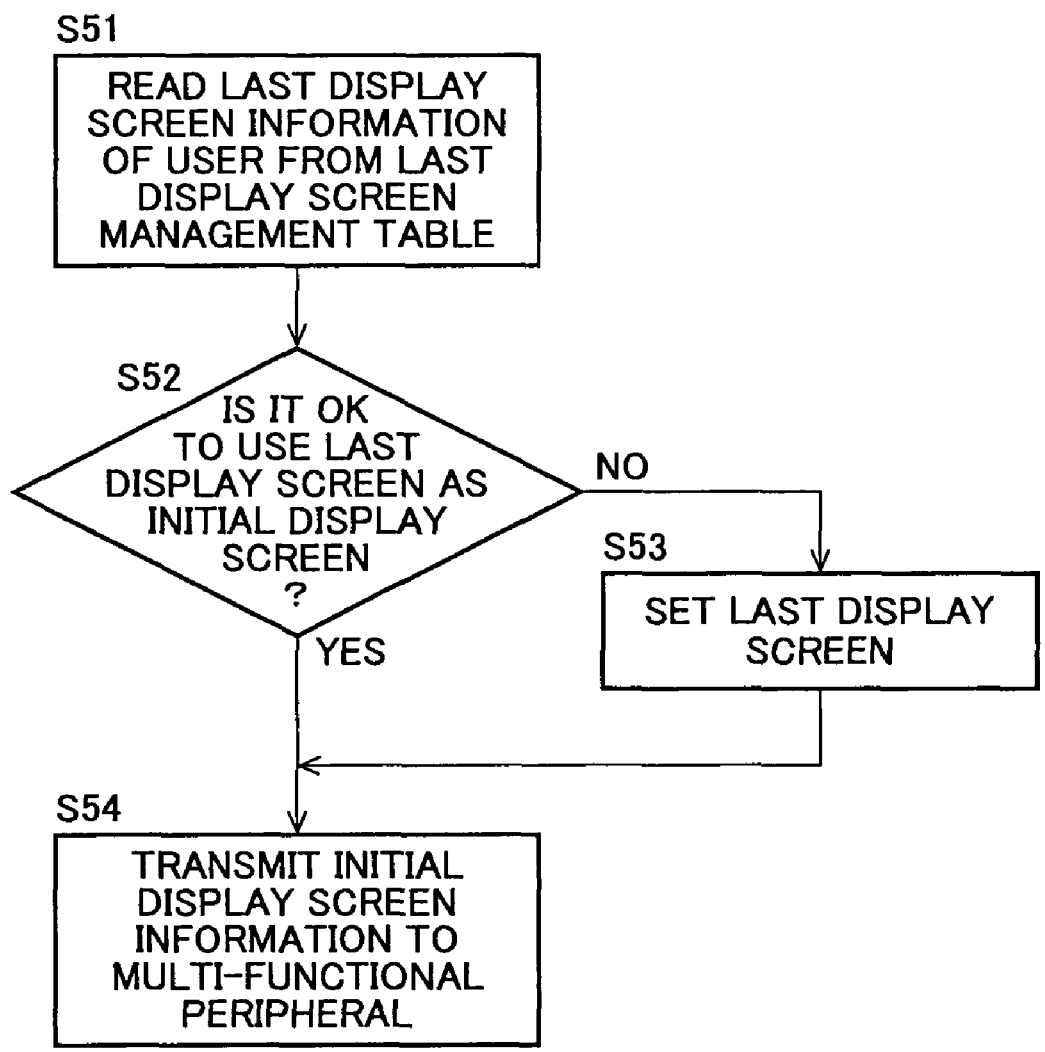
FIG. 12 is a flowchart for describing an example of determining processing of an initial display screen in the authentication server.

FIG. 12 is a flowchart for describing an example of processing for determining an initial display screen in the authentication server. First, the multi-functional peripheral 1 transmits the last display screen information which is displayed at the time of logout to the authentication server 2.

The authentication server 2 reads the last display screen information of a user from the last display screen management table 52 (step S51), and determines whether it is usable as the initial display screen at the time of next login of the multi-functional peripheral 1 (step S52). Whether it is usable as the initial display screen is able to be judged from whether or not the last display screen information transmitted from the multi-functional peripheral 1 is consistent with the information of the initial display screen management table, similarly to the example 1, while holding the initial display screen management table 53 as shown in FIG. 9 in the authentication server.

When the last display screen information is consistent with the information of the initial display screen table, the last display screen information is held, and at the time of next login of the multi-functional peripheral 1, when authentication of the user has been completed successfully, an instruction to switch as the initial display screen with using the last display screen information that has been held (initial mode setting information) is transmitted to the multi-functional peripheral 1 (step S54).

Furthermore, when the last display screen information is not consistent with the information of the initial display screen management table 53 and determined as not usable as the initial display screen, like the processing in the multi-functional peripheral 1 of the example 1, predetermined alternative information is set as the last display screen information to be held (step S53). Alternatively, like the processing in the multi-functional peripheral 1 of the example 2, when the information to specify the last display screen at the time of logout is not consistent with the information stored in the initial display screen management table 53, and when the information to specify the screen of the upper hierarchy of the last display screen has been stored in the initial display screen management table 53, a screen of the closest hierarchy to the last display screen among the screens of the upper hierarchy of the last display screen is judged to be usable and may be set as the last display screen information to be held.

In the authentication server, then, at the time of next login of the multi-functional peripheral 1, and when authentication of the user has been completed successfully, an instruction to switch as the initial display screen with using the last display screen information that has been held (initial mode setting information) is transmitted to the multi-functional peripheral 1 (step S54).

In this manner, in the fourth example according to the present invention, the authentication server 2 compares the last display screen information notified from the multi-functional peripheral 1 at the time of logout from the multi-functional peripheral 1 with the information stored in the initial display screen management table 53 and judges whether or not the information to specify the last display screen is appropriate as the information to specify the initial display screen at the time of login. Then, the judging portion, when judging that the last display screen of the initial mode setting information is inappropriate as the information to specify the initial display screen, instructs the multi-functional peripheral 1 to display not the information to specify the last display screen at the time of logout but a screen in accordance with a predetermined condition.

Another screen in accordance with the above-described predetermined condition may be a previously determined screen, or may be a screen of the closest hierarchy to the last display screen among the screens of the upper hierarchy of the last display screen, when the information to specify the last display screen at the time of logout is not consistent with the information stored in the initial display screen management table 53, and when the information to specify the screen of the upper hierarchy of the last display screen has been stored in the initial display screen management table 53.

In this way, in the present example, when the last display screen given to the authentication server 2 from the multi-functional peripheral 1 at the time of logout from the multi-functional peripheral is inappropriate as the initial display screen, regarding a predetermined screen or a screen of an upper hierarchy closest to the last display screen as the last display screen, and an instruction to switch to the last display screen at the time of next login of the multi-functional peripheral 1 is performed, and thereby, the convenience is able to be further improved. Additionally, even when a plurality of different multi-functional peripherals are managed by the authentication server, a unified policy as a system is able to be controlled on the side of the authentication server.

Example 5

Each processing in the examples 1 to 4 described above is able to be realized by a system in which a plurality of multi-functional peripherals 1 and an authentication server 2 are connected. That is, in the authentication server 2, last display screen information at the time of logout from the multi-functional peripheral 1 is managed for each of the plurality of multi-functional peripherals 1, and by transmitting the initial mode setting information for each multi-functional peripheral 1, a plurality of multi-functional peripherals 1 are able to be managed.

Here, in contrast to the authentication server 2 of the configuration in FIG. 1, a configuration in which a plurality of multi-functional peripherals 1 are connected via a network is considered. In the user information management DB 26 of the authentication server 2, the last display screen management table 52 as shown in FIG. 7 is held for each of the multi-functional peripherals 1. In each last display screen table 52, information of a screen lastly displayed at the time of previous logout is recorded in the multi-functional peripheral 1 for each user ID.

In the authentication server 2, on receipt of a login request from any multi-functional peripheral 1 among a plurality of multifunctional peripherals 1, that is, a boot notification of the multi-functional peripheral, device information unique to the multi-functional peripheral 1 included in the boot notification is discriminated to specify a corresponding last display screen table out of a plurality of last display screen tables 52 held in the user information management DB 26. Thereby, with using the last display screen table 52 corresponding to the multi-functional peripheral 1 in requesting the login, the display processing for displaying the initial display screen in the multi-functional peripheral 1 is able to be executed. As the display processing for displaying the initial display screen by the specified last display screen table 52, the above-described processing of the examples 1 to 4 is able to be performed.

Example 6

In the present example, each processing of the examples 1 to 4 described above is able to be executed even when the same user performs login operation in a different multi-functional peripheral of the same model.

In the present example, in the last display screen management table as shown in FIG. 7, model information of the multi-functional peripheral 1 for each user ID at the time of previous logout of the user is further stored. As the model information, for example, a product model number of the multi-functional peripheral 1 or the like is usable. Furthermore, in the boot notification transmitted to the authentication server 2 at the time of logging in the multi-functional peripheral 1, transmission thereof is performed by further including the model information to the device information included in the boot notification.

In performing login processing with the boot notification transmitted from the multi-functional peripheral 1, the authentication server 2 discriminates the model information included in the device information of the boot notification, and further obtains the user ID input to the login screen and compares it with the last display screen management table held in the authentication server 2. Then, when the model information of the multi-functional peripheral 1 which was used by the login user at the time of previous logout is consistent with the model information of the multi-functional peripheral 1 which is used at the time of login this time, display processing for displaying an initial display screen of the multi-functional peripheral 1 is performed by using the last display screen table. Furthermore, when there is no consistence in the model information, processing to display a predetermined default screen which has been prepared in advance by the multi-functional peripheral 1 is performed. For the display processing for displaying the initial display screen with the last display screen table 52 which is judged to be usable, the above-described processing of the examples 1 to 4 is able to be performed.

With the above-described processing, although a user performs login by using a multi-functional peripheral 1 which is different from that of the previous time, when the multi-functional peripheral is the same model type as the multi-functional peripheral 1 used at the previous time, it is possible to display an initial display screen based on the last display screen at the time of previous logout.

Example 7

In the multi-functional peripheral 1, various setting values such as a resolution in image formation are set. By storing such setting values of the multi-functional peripheral 1 together with the last display screen information, at the time of next login, setting values at the time of previous logout are obtained to be able to be set in the multi-functional peripheral 1.

Here, in a last display screen management table shown in FIG. 7, setting value information of the multi-functional peripheral 1 at the time of previous logout by the user are further stored for each user ID. In the authentication server 2, in performing login processing by the boot notification transmitted from the multi-functional peripheral 1 and performing processing for transmitting initial mode setting information to the multi-functional peripheral 1, when there are previous setting values of the user registered in the last display screen management table, the setting values are transmitted together with the initial mode setting information to the multi-functional peripheral 1. The multi-functional peripheral 1, on receipt of the initial mode setting information, displays a last display screen according to specifying information of the last display screen by the initial mode information and information to instruct the display and sets the setting values in the multi-functional peripheral 1 by using transmitted setting values.

In the present example, since the setting values of the multi-functional peripheral 1 at the time of previous logout for each user are stored in the last display screen management table, a user is easily able to execute various processing of the multi-functional peripheral 1 using the setting values of the previous time at the time of next login.

According to the present invention, the authentication system provided with a function for displaying a screen at the time of previous logout at the time of login for the multi-functional peripheral and changing the initial display screen corresponding to the last display screen at the time of logout from the multi-functional peripheral so that the initial display screen at the time of login is optimized to be able to improve convenience of a user, the multi-functional peripheral configuring the authorization system and the authorization server are able to be provided.

The invention claimed is:

1. An authentication system composed of a multi-functional peripheral and an authentication server that is connected to and is able to communicate with the multi-functional peripheral and performs authentication of login information input in the multi-functional peripheral, comprising:
an initial display screen storage portion storing information to specify a screen capable of initially displaying at the time of login of the multi-functional peripheral in advance; and
a judging portion comparing information to specify a last display screen of the multi-functional peripheral with information stored in the initial display screen storage portion and judging whether or not the information to specify the last display screen is appropriate as information to specify an initial display screen at the time of login, wherein
when the judging portion judges that the last display screen at the time of logout of the multi-functional peripheral is inappropriate as the initial display screen, another screen in accordance with a predetermined condition is displayed in the multi-functional peripheral, and wherein
the authentication server has:
a storage portion storing information to specify the last display screen at the time of logout from the multi-functional peripheral that is given from the multi-functional peripheral; and
a notifying portion notifying the multi-functional peripheral of initial mode setting information to instruct an initial display screen after login of the multi-functional peripheral, wherein
the initial mode setting information includes the information to specify the last display screen and information to indicate that the last display screen is displayed as the initial display screen, and
the multi-functional peripheral has:
a notifying portion notifying the authentication server of the information to specify the last display screen at the time of logout of the multi-functional peripheral;
a control portion controlling to display the last display screen as an initial display screen after login based on the initial mode setting information received from the authentication server;
the initial display screen storage portion; and
the judging portion, wherein
the judging portion compares the information to specify the last display screen at the time of logout with the information stored in the initial display screen storage portion and judges whether or not the information to specify the last display screen is appropriate as information to specify an initial display screen at the time of next login, and notifies the authentication server of not the information to specify the last display screen at the time of logout but information to specify another screen in accordance with a predetermined condition as the information to specify the last display screen when the judging portion judges that the last display screen at the time of logout is inappropriate as the information to specify the initial display screen.

2. The authentication system as defined in claim 1, wherein the another screen in accordance with the predetermined condition is a previously determined screen to be displayed as an initial display screen when the last display screen at the time of logout is judged to be inappropriate as the information to specify the initial display screen.

3. The authentication system as defined in claim 1, wherein the multi-functional peripheral enables display change between hierarchies of a screen having a hierarchical structure in accordance with a predetermined operation, and
when the information to specify the last display screen at the time of logout is not consistent with the information stored in the initial display screen storage portion and when information to specify a screen of an upper hierarchy of the last display screen has been stored in the initial display screen storage portion,
the another screen in accordance with the predetermined condition is a screen of the closest hierarchy to the last display screen among screens of the upper hierarchy of the last display screen.

4. An authentication system composed of a multi-functional peripheral and an authentication server that is connected to and is able to communicate with the multi-functional peripheral and performs authentication of login information input in the multi-functional peripheral, comprising:
an initial display screen storage portion storing information to specify a screen capable of initially displaying at the time of login of the multi-functional peripheral in advance; and
a judging portion comparing information to specify a last display screen of the multi-functional peripheral with information stored in the initial display screen storage portion and judging whether or not the information to specify the last display screen is appropriate as information to specify an initial display screen at the time of login, wherein
when the judging portion judges that the last display screen at the time of logout of the multi-functional peripheral is inappropriate as the initial display screen, another screen in accordance with a predetermined condition is displayed in the multi-functional peripheral, and wherein
the authentication server has:
a storage portion storing information to specify a last display screen at the time of logout from the multi-functional peripheral that is given from the multi-functional peripheral; and
a notifying portion notifying the multi-functional peripheral of initial mode setting information to instruct an initial display screen after login of the multi-functional peripheral, wherein
the initial mode setting information includes the information to specify the last display screen and information to indicate that the last display screen is displayed as the initial display screen, and the multi-functional peripheral has:

a notifying portion notifying the authentication server of the information to specify the last display screen at the time of logout of the multi-functional peripheral;

a control portion controlling to display the last display screen as an initial display screen after login based on the initial mode setting information received from the authentication server;

the initial display screen storage portion; and the judging portion, wherein the judging portion compares the information to specify the last display screen included in the initial mode setting information with the information stored in the initial display screen storage portion and judges whether or not the information to specify the last display screen is appropriate as information to specify an initial display screen at the time of login, and when the judging portion judges that the information to specify the last display screen included in the initial mode setting information is inappropriate as the information to specify the initial display screen, not the last display screen designated by the initial mode setting information but another screen in accordance with a predetermined condition is displayed as the initial display screen at the time of login.

5. The authentication system as defined in claim 4, wherein the another screen in accordance with the predetermined condition is a previously determined screen to be displayed as an initial display screen when the information to specify the last display screen included in the initial mode setting information is judged to be inappropriate as the information to specify the initial display screen.

6. The authentication system as defined in claim 4, wherein the multi-functional peripheral enables display change between hierarchies of a screen having a hierarchical structure in accordance with a predetermined operation, and when the information to specify the last display screen included in the initial mode setting information is not consistent with the information stored in the initial display screen storage portion and when the information to specify the screen of the upper hierarchy of the last display screen has been stored in the initial display screen storage portion, the another screen in accordance with the predetermined condition is the screen of the closest hierarchy to the last display screen among the screens of the upper hierarchy of the last display screen.

7. An authentication system composed of a multi-functional peripheral and an authentication server that is connected to and is able to communicate with the multi-functional peripheral and performs authentication of login information input in the multi-functional peripheral, comprising:

an initial display screen storage portion storing information to specify a screen capable of initially displaying at the time of login of the multi-functional peripheral in advance; and a judging portion comparing information to specify a last display screen of the multi-functional peripheral with information stored in the initial display screen storage portion and judging whether or not the information to specify the last display screen is appropriate as information to specify an initial display screen at the time of login, wherein when the judging portion judges that the last display screen at the time of logout of the multi-functional peripheral is inappropriate as the initial display screen, another screen in accordance with a predetermined condition is displayed in the multi-functional peripheral, and wherein the multi-functional peripheral has:

a notifying portion notifying the authentication server of the information to specify the last display screen at the time of logout of the multi-functional peripheral; and a control portion controlling to display the last display screen as an initial display screen after login based on the initial mode setting information received from the authentication server, and the authentication server has:

a storage portion storing the information to specify the last display screen at the time of logout from the multi-functional peripheral that is given from the multi-functional peripheral;

a notifying portion notifying the multi-functional peripheral of initial mode setting information including the information to specify the last display screen and information to indicate that the last display screen is displayed as the initial display screen;

the initial display screen storage portion; and the judging portion, wherein the judging portion compares the information to specify the last display screen at the time of logout with the information stored in the initial display screen storage portion and judges whether or not the information to specify the last display screen is appropriate as information to specify an initial display screen at the time of next login, and when the judging portion judges that the last display screen at the time of logout is inappropriate as the information to specify the initial display screen, not the information to specify the last display screen at the time of logout but information to specify another screen in accordance with a predetermined condition is transmitted to the multi-functional peripheral included in the initial mode setting information as the information to specify the last display screen.

8. The authentication system as defined in claim 7, wherein the another screen in accordance with the predetermined condition is a previously determined screen to be displayed as an initial display screen, when the last display screen at the time of logout transmitted from the multi-functional peripheral is judged to be inappropriate as the information to specify the initial display screen.

9. The authentication system as defined in claim 7, wherein the multi-functional peripheral enables display change between hierarchies of a screen having a hierarchical structure in accordance with a predetermined operation, and when the information to specify the last display screen at the time of logout transmitted from the multi-functional peripheral is not consistent with the information stored in the initial display screen storage portion and when the information to specify the screen of the upper hierarchy of the last display screen has been stored in the initial display screen storage portion, the another screen in accordance with the predetermined condition is the screen of the closest hierarchy to the last display screen among the screens of the upper hierarchy of the last display screen.

10. The authentication system as defined in any one of claims 1 to 9, wherein the authentication server stores in the storage portion the information to specify the last display screen at the time of logout in association with device information unique to a multi-functional peripheral, and the notifying portion notifying the multi-functional peripheral of the initial mode setting information notifies the multi-functional peripheral of initial mode setting information corresponding to the device information unique to the multi-functional peripheral.

11. The authentication system as defined in any one of claims 1 to 9, wherein
the authentication server stores in the storage portion model information of the multi-functional peripheral in association with the information to specify the last display screen at the time of logout, and
a notifying portion notifying the multi-functional peripheral of the initial mode setting information notifies a multi-functional peripheral that the model information is consistent therewith of the initial mode setting information.

12. The authentication system as defined in any one of claims 1 to 9, wherein
the authentication server stores in the storage portion setting information of the multi-functional peripheral in association with the information to specify the last display screen at the time of logout, and
a notifying portion notifying the multi-functional peripheral of the initial mode setting information notifies the multi-functional peripheral of the setting information together with the initial mode setting information.

13. A multi-functional peripheral which is connected to an authentication server for performing authentication of login information input in a multi-functional peripheral, comprising:
a notifying portion notifying the authentication server of information to specify a last display screen at the time of logout of the multi-functional peripheral;
a control portion receiving, from the authentication server, initial mode setting information including the information to specify the last display screen and information to indicate that the last display screen is displayed as the initial display screen, and controlling to display the last display screen as an initial display screen after login based on the received initial mode setting information;
an initial display screen storage portion storing information to specify a screen capable of initially displaying at the time of login in advance; and
a judging portion comparing the information to specify the last display screen of the multi-functional peripheral with information stored in the initial display screen storage portion and judging whether or not the information to specify the last display screen is appropriate as information to specify an initial display screen at the time of a next login, wherein
when the judging portion judges that the last display screen at the time of logout is inappropriate as the initial display screen, the judging portion notifies the authentication server of not the information to specify the last display screen at the time of logout but information to specify another screen in accordance with a predetermined condition as the information to specify the last display screen when the judging portion judges that the last display screen at the time of logout is inappropriate as the information to specify the initial display screen, whereby said another screen determined in accordance with said predetermined condition is caused to be displayed as an initial display screen at the time of said next login.

14. The multi-functional peripheral as defined in claim 13, wherein
the multi-functional peripheral enables display change between hierarchies of a screen having a hierarchical structure in accordance with a predetermined operation, and
when the information to specify the last display screen at the time of logout is not consistent with the information stored in the initial display screen storage portion and when information to specify a screen of an upper hierarchy of the last display screen has been stored in the initial display screen storage portion,
the another screen in accordance with the predetermined condition is a screen of the closest hierarchy to the last display screen among screens of the upper hierarchy of the last display screen.

15. The multi-functional peripheral as defined in claim 13, wherein
the judging portion compares the information to specify the last display screen included in the initial mode setting information with the information stored in the initial display screen storage portion and judges whether or not the information to specify the last display screen is appropriate as information to specify an initial display screen at the time of login, and
displays not the last display screen instructed by the initial mode setting information but another screen in accordance with a predetermined condition as the initial display screen at the time of login when the judging portion judges that the information to specify the last display screen included in the initial mode setting information is inappropriate as the information to specify the initial display screen.

16. The multi-functional peripheral as defined in claim 15, wherein
the another screen in accordance with the predetermined condition is a previously determined screen to be displayed as an initial display screen, when the information to specify the last display screen included in the initial mode setting information is judged to be inappropriate as the information to specify the initial display screen.

17. The multi-functional peripheral as defined in claim 15, wherein
the multi-functional peripheral enables display change between hierarchies of a screen having a hierarchical structure in accordance with a predetermined operation, and
when the information to specify the last display screen included in the initial mode setting information is not consistent with the information stored in the initial display screen storage portion and when the information to specify the screen of the upper hierarchy of the last display screen has been stored in the initial display screen storage portion, the another screen in accordance with the predetermined condition is the screen of the closest hierarchy to the last display screen among the screens of the upper hierarchy of the last display screen.

18. An authentication server that is connected to and is able to communicate with a multi-functional peripheral and performs authentication of login information input in the multi-functional peripheral, comprising:
a storage portion storing information to specify a last display screen at the time of logout from the multi-functional peripheral that is given from the multi-functional peripheral;
a notifying portion notifying the multi-functional peripheral of initial mode setting information including the information to specify the last display screen and information to indicate that the last display screen is displayed as the initial display screen;

an initial display screen storage portion storing information to specify a screen capable of initially displaying at the time of login in advance; and a judging portion comparing the information to specify the last display screen at the time of logout notified from the multi-functional peripheral with the information stored in the initial display screen storage portion and judging whether or not the information to specify the last display screen is appropriate as information to specify an initial display screen at the time of a next login of the multi-functional peripheral, wherein when the judging portion judges that the last display screen at the time of logout is inappropriate as the information to specify the initial display screen, not the information to specify the last display screen at the time of logout but information to specify another screen in accordance with a predetermined condition is included in the initial mode setting information as the information to specify the last display screen to be transmitted to the multi-functional peripheral wherein said another screen in accordance with the predetermined condition is a previously determined screen to be displayed as an initial display screen, when the last display screen at the time of logout is judged to be inappropriate as the information to specify the initial display screen.

19. The authentication server as defined in claim 18, wherein the multi-functional peripheral enables display change between hierarchies of a screen having a hierarchical structure in accordance with a predetermined operation, and when the information to specify the last display screen that has been displayed at the time of logout is not consistent with the information stored in the initial display screen storage portion and when the information to specify the screen of the upper hierarchy of the last display screen has been stored in the initial display screen storage portion, the another screen in accordance with the predetermined condition is the screen of the closest hierarchy to the last display screen among the screens of the upper hierarchy of the last display screen.

20. The authentication server as defined in any one of claims 18 to 19, wherein the information to specify the last display screen at the time of logout is stored in the storage portion in association with device information unique to a multi-functional peripheral, and a notifying portion for notifying the multi-functional peripheral of the initial mode setting information notifies to the multi-functional peripheral initial mode setting information corresponding to the device information unique to the multi-functional peripheral.

21. The authentication server as defined in any one of claims 18 to 19, wherein model information of the multi-functional peripheral is stored in the storage portion in association with the information to specify the last display screen at the time of logout, and a notifying portion for notifying the multi-functional peripheral of the initial mode setting information notifies a multi-functional peripheral that the model information is consistent therewith of the initial mode setting information.

22. The authentication server as defined in any one of claims 18 to 19, wherein setting information of the multi-functional peripheral is stored in the storage portion in association with the information to specify the last display screen at the time of logout, and a notifying portion for notifying the multi-functional peripheral of the initial mode setting information notifies the multi-functional peripheral of the setting information together with the initial mode setting information.

\* \* \* \* \*